US012120777B2

(12) United States Patent
Sebastian et al.

(10) Patent No.: US 12,120,777 B2
(45) Date of Patent: Oct. 15, 2024

(54) AEROSOL DELIVERY DEVICE HAVING A RESONANT TRANSMITTER

(71) Applicant: RAI Strategic Holdings, Inc., Winston-Salem, NC (US)

(72) Inventors: Andries Sebastian, Clemmons, NC (US); Rajesh Sur, Winston-Salem, NC (US); Stephen Benson Sears, Siler City, NC (US); Kathryn Lynn Wilberding, High Point, NC (US); Timothy Frederick Thomas, High Point, NC (US); Curtis Foster Doe, Winston-Salem, NC (US); Billy Tyrone Conner, Clemmons, NC (US); Balager Ademe, Winston-Salem, NC (US); Thaddeus Jude Jackson, High Point, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 144 days.

(21) Appl. No.: 18/077,614

(22) Filed: Dec. 8, 2022

(65) Prior Publication Data

US 2023/0099271 A1 Mar. 30, 2023

Related U.S. Application Data

(63) Continuation of application No. 17/579,127, filed on Jan. 19, 2022, now Pat. No. 11,553,562, which is a (Continued)

(51) Int. Cl.

| | |
|---|---|
| ***H05B 1/02*** | (2006.01) |
| ***A24D 1/20*** | (2020.01) |

(Continued)

(52) U.S. Cl.
CPC ............. *H05B 1/0227* (2013.01); *A24D 1/20* (2020.01); *A24F 40/465* (2020.01); *H05B 6/108* (2013.01); *A24F 40/20* (2020.01)

(58) Field of Classification Search
CPC ........ A24F 40/465; A24F 40/46; A24F 40/20; H05B 1/0227; H05B 6/108; A24D 1/20
See application file for complete search history.

(56) References Cited

U.S. PATENT DOCUMENTS 1,514,682 A 11/1924 Wilson
1,771,366 A 7/1930 Wyss et al.
(Continued)

FOREIGN PATENT DOCUMENTS

AU 276250 7/1965
CA 2 641 869 5/2010
(Continued)

*Primary Examiner* — Hae Moon Hyeon
(74) *Attorney, Agent, or Firm* — WOMBLE BOND DICKINSON (US) LLP

(57) ABSTRACT

An aerosol delivery device is provided that comprises a control body and an aerosol source member. The aerosol delivery device includes a resonant transformer comprising a resonant transmitter and a resonant receiver. The aerosol source member includes an inhalable substance medium at least a portion of which is positioned proximate the resonant transmitter. The resonant transmitter is configured to generate an oscillating magnetic field and induce an alternating voltage in the resonant receiver when exposed to the oscillating magnetic field, such that the alternating voltage causes the resonant receiver to generate heat and thereby vaporize components of the inhalable substance medium to produce an aerosol. In some implementations, the resonant receiver comprises part of the control body. In other implementations, the resonant receiver comprises part of the aerosol source member.

20 Claims, 12 Drawing Sheets

Related U.S. Application Data continuation of application No. 16/690,923, filed on Nov. 21, 2019, now Pat. No. 11,265,970, which is a continuation of application No. 15/799,365, filed on Oct. 31, 2017, now Pat. No. 10,517,332.

(51) Int. Cl.

| | |
|---|---|
| ***A24F 40/465*** | (2020.01) |
| ***H05B 6/10*** | (2006.01) |
| *A24F 40/20* | (2020.01) |

(56) References Cited

U.S. PATENT DOCUMENTS

| | | | |
|---|---|---|---|
| 2,057,353 | A | 10/1936 | Whittemore, Jr. |
| 2,104,266 | A | 1/1938 | McCormick |
| 3,200,819 | A | 8/1965 | Gilbert |
| 3,479,561 | A | 11/1969 | Janning |
| 4,284,089 | A | 8/1981 | Ray |
| 4,303,083 | A | 12/1981 | Burruss, Jr. |
| 4,735,217 | A | 4/1988 | Gerth et al. |
| 4,848,374 | A | 7/1989 | Chard et al. |
| 4,907,606 | A | 3/1990 | Lilja et al. |
| 4,922,901 | A | 5/1990 | Brooks et al. |
| 4,945,931 | A | 8/1990 | Gori |
| 4,947,874 | A | 8/1990 | Brooks et al. |
| 4,947,875 | A | 8/1990 | Brooks et al. |
| 4,986,286 | A | 1/1991 | Roberts et al. |
| 5,019,122 | A | 5/1991 | Clearman et al. |
| 5,042,510 | A | 8/1991 | Curtiss et al. |
| 5,060,671 | A | 10/1991 | Counts et al. |
| 5,093,894 | A | 3/1992 | Deevi et al. |
| 5,105,838 | A | 4/1992 | White et al. |
| 5,144,962 | A | 9/1992 | Counts et al. |
| 5,154,192 | A | 10/1992 | Sprinkel et al. |
| 5,220,930 | A | 6/1993 | Gentry |
| 5,249,586 | A | 10/1993 | Morgan et al. |
| 5,261,424 | A | 11/1993 | Sprinkel, Jr. |
| 5,271,419 | A | 12/1993 | Arzonico et al. |
| 5,322,075 | A | 6/1994 | Deevi et al. |
| 5,353,813 | A | 10/1994 | Deevi et al. |
| 5,369,723 | A | 11/1994 | Counts et al. |
| 5,372,148 | A | 12/1994 | McCafferty et al. |
| 5,388,574 | A | 2/1995 | Ingebrethsen et al. |
| 5,388,594 | A | 2/1995 | Counts et al. |
| 5,408,574 | A | 4/1995 | Deevi et al. |
| 5,468,936 | A | 11/1995 | Deevi et al. |
| 5,498,850 | A | 3/1996 | Das |
| 5,515,842 | A | 5/1996 | Ramseyer et al. |
| 5,530,225 | A | 6/1996 | Hajaligol |
| 5,564,442 | A | 10/1996 | MacDonald et al. |
| 5,649,554 | A | 7/1997 | Sprinkel et al. |
| 5,666,977 | A | 9/1997 | Higgins et al. |
| 5,687,746 | A | 11/1997 | Rose et al. |
| 5,726,421 | A | 3/1998 | Fleischhauer et al. |
| 5,727,571 | A | 3/1998 | Meiring et al. |
| 5,743,251 | A | 4/1998 | Howell et al. |
| 5,799,663 | A | 9/1998 | Gross et al. |
| 5,819,756 | A | 10/1998 | Mielordt |
| 5,865,185 | A | 2/1999 | Collins et al. |
| 5,865,186 | A | 2/1999 | Volsey, II |
| 5,878,752 | A | 3/1999 | Adams et al. |
| 5,894,841 | A | 4/1999 | Voges |
| 5,934,289 | A | 8/1999 | Watkins et al. |
| 5,954,979 | A | 9/1999 | Counts et al. |
| 5,967,148 | A | 10/1999 | Harris et al. |
| 6,040,560 | A | 3/2000 | Fleischhauer et al. |
| 6,053,176 | A | 4/2000 | Adams et al. |
| 6,089,857 | A | 7/2000 | Matsuura et al. |
| 6,095,153 | A | 8/2000 | Kessler et al. |
| 6,125,853 | A | 10/2000 | Susa et al. |
| 6,155,268 | A | 12/2000 | Takeuchi |
| 6,164,287 | A | 12/2000 | White |
| 6,196,218 | B1 | 3/2001 | Voges |
| 6,196,219 | B1 | 3/2001 | Hess et al. |
| 6,598,607 | B2 | 7/2003 | Adiga et al. |
| 6,601,776 | B1 | 8/2003 | Oljaca et al. |
| 6,615,840 | B1 | 9/2003 | Fournier et al. |
| 6,688,313 | B2 | 2/2004 | Wrenn et al. |
| 6,772,756 | B2 | 8/2004 | Shayan |
| 6,803,545 | B2 | 10/2004 | Blake et al. |
| 6,810,883 | B2 | 11/2004 | Felter et al. |
| 6,854,461 | B2 | 2/2005 | Nichols |
| 6,854,470 | B1 | 2/2005 | Pu |
| 6,908,874 | B2 | 6/2005 | Woodhead et al. |
| 6,929,013 | B2 | 8/2005 | Ashcraft et al. |
| 7,040,314 | B2 | 5/2006 | Nguyen et al. |
| 7,117,867 | B2 | 10/2006 | Cox et al. |
| 7,195,019 | B2 | 3/2007 | Hancock et al. |
| 7,275,548 | B2 | 10/2007 | Hancock et al. |
| 7,276,120 | B2 | 10/2007 | Holmes |
| 7,293,565 | B2 | 11/2007 | Griffin et al. |
| 7,513,253 | B2 | 4/2009 | Kobayashi et al. |
| 7,726,320 | B2 | 6/2010 | Robinson et al. |
| 7,775,459 | B2 | 8/2010 | Martens, III et al. |
| 7,832,410 | B2 | 11/2010 | Hon |
| 7,845,359 | B2 | 12/2010 | Montaser |
| 7,896,006 | B2 | 3/2011 | Hamano et al. |
| 8,127,772 | B2 | 3/2012 | Montaser |
| 8,156,944 | B2 | 4/2012 | Han |
| 8,205,622 | B2 | 6/2012 | Pan |
| 8,314,591 | B2 | 11/2012 | Terry et al. |
| 8,365,742 | B2 | 2/2013 | Hon |
| 8,375,957 | B2 | 2/2013 | Hon |
| 8,402,976 | B2 | 3/2013 | Fernando et al. |
| 8,424,538 | B2 | 4/2013 | Thomas et al. |
| 8,464,726 | B2 | 6/2013 | Sebastian et al. |
| 8,499,766 | B1 | 8/2013 | Newton |
| 8,528,569 | B1 | 9/2013 | Newton |
| 8,550,069 | B2 | 10/2013 | Alelov |
| 8,689,804 | B2 | 4/2014 | Fernando et al. |
| 8,794,231 | B2 | 8/2014 | Thorens et al. |
| 8,851,081 | B2 | 10/2014 | Fernando et al. |
| 8,851,083 | B2 | 10/2014 | Oglesby et al. |
| 8,910,639 | B2 | 12/2014 | Chang et al. |
| 8,915,254 | B2 | 12/2014 | Monsees et al. |
| 8,925,555 | B2 | 1/2015 | Monsees et al. |
| 9,078,473 | B2 | 7/2015 | Worm et al. |
| 9,220,302 | B2 | 12/2015 | DePiano et al. |
| 9,282,773 | B2 | 3/2016 | Greim et al. |
| 9,423,152 | B2 | 8/2016 | Ampolini et al. |
| 9,459,021 | B2 | 10/2016 | Greim et al. |
| 9,484,155 | B2 | 11/2016 | Peckerar et al. |
| 9,516,899 | B2 | 12/2016 | Plojoux et al. |
| 9,820,512 | B2 | 11/2017 | Mironov et al. |
| 10,058,125 | B2 | 8/2018 | Worm et al. |
| 10,154,689 | B2 | 12/2018 | Nordskog et al. |
| 10,258,086 | B2 | 4/2019 | Sur |
| 10,517,332 | B2 * | 12/2019 | Sebastian ................. A24D 1/20 |
| 11,265,970 | B2 * | 3/2022 | Sebastian ............. A24F 40/465 |
| 11,553,562 | B2 * | 1/2023 | Sebastian ............... H05B 6/108 |
| 2002/0146242 | A1 | 10/2002 | Vieira |
| 2003/0226837 | A1 | 12/2003 | Blake et al. |
| 2004/0118401 | A1 | 6/2004 | Smith et al. |
| 2004/0129280 | A1 | 7/2004 | Woodson et al. |
| 2004/0200488 | A1 | 10/2004 | Felter et al. |
| 2004/0226568 | A1 | 11/2004 | Takeuchi et al. |
| 2005/0016550 | A1 | 1/2005 | Katase |
| 2006/0016453 | A1 | 1/2006 | Kim |
| 2006/0196518 | A1 | 9/2006 | Hon |
| 2007/0074734 | A1 | 4/2007 | Braunshteyn et al. |
| 2007/0102013 | A1 | 5/2007 | Adams et al. |
| 2007/0215167 | A1 | 9/2007 | Crooks et al. |
| 2008/0085103 | A1 | 4/2008 | Beland et al. |
| 2008/0092912 | A1 | 4/2008 | Robinson et al. |
| 2008/0149118 | A1 | 6/2008 | Oglesby et al. |
| 2008/0257367 | A1 | 10/2008 | Paterno et al. |
| 2008/0276947 | A1 | 11/2008 | Martzel |
| 2008/0302374 | A1 | 12/2008 | Wengert et al. |
| 2009/0095311 | A1 | 4/2009 | Hon |
| 2009/0095312 | A1 | 4/2009 | Herbrich et al. |
| 2009/0126745 | A1 | 5/2009 | Hon |
| 2009/0188490 | A1 | 7/2009 | Hon |
| 2009/0230117 | A1 | 9/2009 | Fernando et al. |
| 2009/0260641 | A1 | 10/2009 | Monsees et al. |

(56) References Cited

U.S. PATENT DOCUMENTS

| | | | |
|---|---|---|---|
| 2009/0260642 | A1 | 10/2009 | Monsees et al. |
| 2009/0272379 | A1 | 11/2009 | Thorens et al. |
| 2009/0283103 | A1 | 11/2009 | Nielsen et al. |
| 2009/0320863 | A1 | 12/2009 | Fernando et al. |
| 2010/0024834 | A1 | 2/2010 | Oglesby et al. |
| 2010/0043809 | A1 | 2/2010 | Magnon |
| 2010/0083959 | A1 | 4/2010 | Siller |
| 2010/0200006 | A1 | 8/2010 | Robinson et al. |
| 2010/0229881 | A1 | 9/2010 | Hearn |
| 2010/0242974 | A1 | 9/2010 | Pan |
| 2010/0307518 | A1 | 12/2010 | Wang |
| 2010/0313901 | A1 | 12/2010 | Fernando et al. |
| 2011/0005535 | A1 | 1/2011 | Xiu |
| 2011/0011396 | A1 | 1/2011 | Fang |
| 2011/0036363 | A1 | 2/2011 | Urtsev et al. |
| 2011/0036365 | A1 | 2/2011 | Chong et al. |
| 2011/0094523 | A1 | 4/2011 | Thorens et al. |
| 2011/0126848 | A1 | 6/2011 | Zuber et al. |
| 2011/0155153 | A1 | 6/2011 | Thorens et al. |
| 2011/0155718 | A1 | 6/2011 | Greim et al. |
| 2011/0168194 | A1 | 7/2011 | Hon |
| 2011/0265806 | A1 | 11/2011 | Alarcon et al. |
| 2011/0309157 | A1 | 12/2011 | Yang et al. |
| 2012/0042885 | A1 | 2/2012 | Stone et al. |
| 2012/0060853 | A1 | 3/2012 | Robinson et al. |
| 2012/0111347 | A1 | 5/2012 | Hon |
| 2012/0132643 | A1 | 5/2012 | Choi et al. |
| 2012/0227752 | A1 | 9/2012 | Alelov |
| 2012/0231464 | A1 | 9/2012 | Yu et al. |
| 2012/0260927 | A1 | 10/2012 | Liu |
| 2012/0279512 | A1 | 11/2012 | Hon |
| 2012/0318882 | A1 | 12/2012 | Abehasera |
| 2013/0037041 | A1 | 2/2013 | Worm et al. |
| 2013/0056013 | A1 | 3/2013 | Terry et al. |
| 2013/0081625 | A1 | 4/2013 | Rustad et al. |
| 2013/0081642 | A1 | 4/2013 | Safari |
| 2013/0192619 | A1 | 8/2013 | Tucker et al. |
| 2013/0255702 | A1 | 10/2013 | Griffith, Jr. et al. |
| 2013/0306084 | A1 | 11/2013 | Flick |
| 2013/0319439 | A1 | 12/2013 | Gorelick et al. |
| 2013/0340750 | A1 | 12/2013 | Thorens et al. |
| 2013/0340775 | A1 | 12/2013 | Juster et al. |
| 2014/0000638 | A1 | 1/2014 | Sebastian et al. |
| 2014/0060554 | A1 | 3/2014 | Collett et al. |
| 2014/0060555 | A1 | 3/2014 | Chang et al. |
| 2014/0096781 | A1 | 4/2014 | Sears et al. |
| 2014/0096782 | A1 | 4/2014 | Ampolini et al. |
| 2014/0109921 | A1 | 4/2014 | Chen |
| 2014/0157583 | A1 | 6/2014 | Ward et al. |
| 2014/0209105 | A1 | 7/2014 | Sears et al. |
| 2014/0224267 | A1 | 8/2014 | Levitz et al. |
| 2014/0253144 | A1 | 9/2014 | Novak et al. |
| 2014/0261408 | A1 | 9/2014 | DePiano et al. |
| 2014/0261486 | A1 | 9/2014 | Potter et al. |
| 2014/0261487 | A1 | 9/2014 | Chapman et al. |
| 2014/0261495 | A1 | 9/2014 | Novak et al. |
| 2014/0270727 | A1 | 9/2014 | Ampolini et al. |
| 2014/0270729 | A1 | 9/2014 | DePiano et al. |
| 2014/0270730 | A1 | 9/2014 | DePiano et al. |
| 2014/0345631 | A1 | 11/2014 | Bowen et al. |
| 2015/0007838 | A1 | 1/2015 | Fernando et al. |
| 2015/0053217 | A1 | 2/2015 | Steingraber et al. |
| 2015/0083150 | A1 | 3/2015 | Conner et al. |
| 2015/0114409 | A1 | 4/2015 | Brammer et al. |
| 2015/0117841 | A1 | 4/2015 | Brammer et al. |
| 2015/0117842 | A1 | 4/2015 | Brammer et al. |
| 2015/0157052 | A1 | 6/2015 | Ademe et al. |
| 2015/0220232 | A1 | 8/2015 | Smith et al. |
| 2015/0245659 | A1 | 9/2015 | DePiano et al. |
| 2016/0037826 | A1 | 2/2016 | Hearn et al. |
| 2016/0150825 | A1 | 6/2016 | Mironov et al. |
| 2016/0174610 | A1 | 6/2016 | Kuczaj |
| 2016/0295921 | A1 | 10/2016 | Mironov et al. |
| 2017/0055584 | A1 | 3/2017 | Blandino et al. |
| 2017/0079326 | A1 | 3/2017 | Mironov |
| 2017/0105452 | A1 | 4/2017 | Mironov et al. |
| 2017/0112191 | A1 | 4/2017 | Sur et al. |
| 2017/0119054 | A1 | 5/2017 | Zinovik et al. |
| 2017/0202266 | A1 | 7/2017 | Sur |
| 2018/0029782 | A1 | 2/2018 | Zuber et al. |
| 2018/0132531 | A1 | 5/2018 | Sur et al. |
| 2018/0310622 | A1* | 11/2018 | Mironov ................. A24F 40/50 |
| 2018/0325179 | A1 | 11/2018 | Li et al. |

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| EP | 2 994 000 | 3/2016 |
| EP | 3 145 341 | 4/2018 |
| EP | 3 145 346 | 8/2018 |
| EP | 3 145 338 | 6/2019 |
| EP | 3 527 087 | 8/2019 |
| EP | 3 506 772 | 9/2020 |
| GB | 2469850 | 11/2010 |
| WO | WO 1997/48293 | 12/1997 |
| WO | WO 01/08514 | 2/2001 |
| WO | WO 03/043450 | 5/2003 |
| WO | WO 2003/034847 | 5/2003 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/091593 | 8/2010 |
| WO | WO 2010/118644 | 10/2010 |
| WO | WO 2010/140937 | 12/2010 |
| WO | WO 2011/010334 | 1/2011 |
| WO | WO 2012/072762 | 6/2012 |
| WO | WO 2012/100523 | 8/2012 |
| WO | WO 2013/089551 | 6/2013 |
| WO | WO 2015/177247 | 11/2015 |
| WO | WO 2015/177255 | 11/2015 |
| WO | WO 2016/005533 | 1/2016 |
| WO | WO 2016/096745 | 6/2016 |
| WO | WO 2016/096927 | 6/2016 |
| WO | WO 2016/120177 | 8/2016 |
| WO | WO 2016/124550 | 8/2016 |
| WO | WO 2016/124552 | 8/2016 |
| WO | WO 2016/156103 | 10/2016 |
| WO | WO 2016/156609 | 10/2016 |
| WO | WO 2016/162446 | 10/2016 |
| WO | WO 2016/184928 | 11/2016 |
| WO | WO 2016/184929 | 11/2016 |
| WO | WO 2016/184930 | 11/2016 |
| WO | WO 2016/199066 | 12/2016 |
| WO | WO 2016/207192 | 12/2016 |
| WO | WO 2018/048450 | 3/2018 |
| WO | WO 2018/096000 | 5/2018 |
| WO | WO 2019/030000 | 2/2019 |
| WO | WO 2019/030167 | 2/2019 |
| WO | WO 2019/030170 | 2/2019 |
| WO | WO 2019/030353 | 2/2019 |
| WO | WO 2019/030363 | 2/2019 |
| WO | WO 2019/030366 | 2/2019 |
| WO | WO 2019/197170 | 10/2019 |
| WO | WO 2019/219867 | 11/2019 |

(56) References Cited

FOREIGN PATENT DOCUMENTS

| | | |
|---|---|---|
| WO | WO 2020/174027 | 9/2020 |
| WO | WO 2020/174028 | 9/2020 |
| WO | WO 2020/174029 | 9/2020 |

* cited by examiner

AEROSOL DELIVERY DEVICE HAVING A RESONANT TRANSMITTER

CROSS-REFERENCE TO RELATED APPLICATIONS

This application is a continuation of U.S. patent application Ser. No. 17/579,127, filed on Jan. 19, 2022, which is a continuation of U.S. patent application Ser. No. 16/690,923, filed on Nov. 21, 2019, and issued as U.S. Pat. No. 11,265,970, which is a continuation of U.S. patent application Ser. No. 15/799,365, filed on Oct. 31, 2017, and issued as U.S. Pat. No. 10,517,332, each of which is incorporated herein in its entirety by reference.

TECHNOLOGICAL FIELD

The present disclosure relates to aerosol delivery articles and uses thereof for yielding tobacco components or other materials in inhalable form. More particularly, the present disclosure relates to aerosol delivery devices and systems, such as smoking articles, that utilize electrically-generated heat to heat tobacco or a tobacco derived material, preferably without significant combustion, in order to provide an inhalable substance in the form of an aerosol for human consumption.

BACKGROUND

Many smoking articles have been proposed through the years as improvements upon, or alternatives to, smoking products based upon combusting tobacco. Exemplary alternatives have included devices wherein a solid or liquid fuel is combusted to transfer heat to tobacco or wherein a chemical reaction is used to provide such heat source. Examples include the smoking articles described in U.S. Pat. No. 9,078,473 to Worm et al., which is incorporated herein by reference.

The point of the improvements or alternatives to smoking articles typically has been to provide the sensations associated with cigarette, cigar, or pipe smoking, without delivering considerable quantities of incomplete combustion and pyrolysis products. To this end, there have been proposed numerous smoking products, flavor generators, and medicinal inhalers which utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference in its entirety. Other representative cigarettes or smoking articles that have been described and, in some instances, been made commercially available include those described in U.S. Pat. No. 4,735,217 to Gerth et al.; U.S. Pat. Nos. 4,922,901, 4,947,874, and 4,947,875 to Brooks et al.; U.S. Pat. No. 5,060,671 to Counts et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano; U.S. Pat. No. 6,772,756 to Shayan; U.S. Pat. Pub. No. 2009/0095311 to Hon; US Pat. Pub. Nos. 2006/0196518, 2009/0126745, and 2009/0188490 to Hon; U.S. Pat. Pub. No. 2009/0272379 to Thorens et al.; U.S. Pat. Pub. Nos. 2009/0260641 and 2009/0260642 to Monsees et al.; U.S. Pat. Pub. Nos. 2008/0149118 and 2010/0024834 to Oglesby et al.; U.S. Pat. Pub. No. 2010/0307518 to Wang; and WO 2010/091593 to Hon, which are incorporated herein by reference.

Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; BLU™ by Lorillard Technologies, Inc.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MY-STICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; SOUTH BEACH SMOKE™.

Articles that produce the taste and sensation of smoking by electrically heating tobacco or tobacco derived materials have suffered from inconsistent performance characteristics. Electrically heated smoking devices have further been limited in many instances by requiring large battery capabilities. Accordingly, it is desirable to provide a smoking article that can provide the sensations of cigarette, cigar, or pipe smoking, without substantial combustion, and that does so through inductive heating.

BRIEF SUMMARY

In various implementations, the present disclosure provides an aerosol delivery device comprising a control body having a housing with an opening defined in one end thereof, a resonant transformer, the resonant transformer comprising a resonant transmitter and a resonant receiver, a driver circuit configured to drive the resonant transmitter, and an aerosol source member that includes an inhalable substance medium, the aerosol source member defining a heated end and a mouth end, the heated end configured to be positioned proximate the resonant transmitter. The driver circuit may be configured to drive the resonant transmitter to generate an oscillating magnetic field and induce an alternating voltage in the resonant receiver when exposed to the oscillating magnetic field, the alternating voltage causing the resonant receiver to generate heat and thereby vaporize components of the inhalable substance medium to produce an aerosol.

In some implementations, the inhalable substance medium may comprise a solid or semi-solid medium. In some implementations the resonant transmitter may comprise a transmitter coil. Some implementations may further comprise a substantially cylindrical coil support member, and the transmitter coil may be configured to circumscribe the coil support member. In some implementations, the resonant receiver may comprise at least one receiver prong. In some implementations, the at least one receiver prong may comprise a single receiver prong extending from a receiver base member, and the receiver prong may be configured to be located in the approximate radial center of the heated end of the aerosol source member. In some implementations, the at least one receiver prong may comprise a plurality of receiver prongs extending radially from a receiver base member, and the plurality of receiver prongs may be configured to be located in the approximate radial center of the heated end of the aerosol source member.

In some implementations, the inhalable substance medium may comprise a tube-shaped substrate, and the resonant receiver may extend into a cavity defined by an inner surface of the substrate. In some implementations, the tube-shaped substrate may comprise an extruded tobacco material. In some implementations, the inhalable substance medium may comprise a tube-shaped substrate that includes a braided wire structure, and the braided wire structure may comprise the resonant receiver. In some implementations, the resonant receiver may comprise a receiver cylinder. In some implementations, the receiver cylinder may circumscribe the inhalable substance medium. In some implementations, the resonant transmitter may comprise a laminate that includes a foil component. In some implementations, the resonant receiver may be constructed of a ferromagnetic material. Some implementations may further comprise a power source including a rechargeable supercapacitor, a rechargeable solid-state battery, or a rechargeable lithium-ion battery, the power source being configured to power the resonant transformer. In some implementations, the power source may further include terminals connectable with a source of energy from which the rechargeable power source is chargeable. In some implementations, the resonant transmitter may be configured to at least partially surround the resonant receiver.

In various implementations, the present disclosure also provides a control body for use with an aerosol source member that defines a heated end and a mouth end and includes an inhalable substance medium, the control body comprising a housing having an opening defined in one end thereof, the opening configured to receive the aerosol source member, a resonant transformer, the resonant transformer comprising a resonant transmitter and a resonant receiver, and a driver circuit configured to drive the resonant transmitter, wherein the driver circuit is configured to drive the resonant transmitter to generate an oscillating magnetic field and induce an alternating voltage in the resonant receiver when exposed to the oscillating magnetic field, the alternating voltage causing the resonant receiver to generate heat, such that, when the aerosol source member is inserted into the control body, the resonant receiver is configured to vaporize components of the inhalable substance medium to produce an aerosol.

In some implementations, the resonant transmitter may comprise a transmitter coil. Some implementations may further comprise a substantially cylindrical coil support member, and the transmitter coil may be configured to circumscribe the coil support member. In some implementations, the resonant receiver may comprise at least one receiver prong. In some implementations, the at least one receiver prong may comprise a single receiver prong extending from a receiver base member, and, when the aerosol source member is inserted into the control body, the receiver prong may be configured to be located in the approximate radial center of the heated end of the aerosol source member. In some implementations, the at least one receiver prong may comprise a plurality of receiver prongs extending radially from a receiver base member, and, when the aerosol source member is inserted into the housing, the plurality of receiver prongs may be configured to be located in the approximate radial center of the heated end of the aerosol source member.

In some implementations, the resonant receiver may comprise a receiver cylinder. In some implementations, when the aerosol source member is inserted into the control body, the receiver cylinder may circumscribe the inhalable substance medium. In some implementations, the resonant transmitter may comprise a laminate that includes a foil component. In some implementations, the resonant receiver may be constructed of a ferromagnetic material. Some implementations may further comprise a power source including a rechargeable supercapacitor, a rechargeable solid-state battery, or a rechargeable lithium-ion battery, the power source being configured to power the resonant transformer. In some implementations, the power source may further include terminals connectable with a source of energy from which the rechargeable power source is chargeable. In some implementations, the resonant transmitter may be configured to at least partially surround the resonant receiver.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described the disclosure in the foregoing general terms, reference will now be made to the accompanying drawings, which are not necessarily drawn to scale, and wherein:

DETAILED DESCRIPTION

Figure 1:
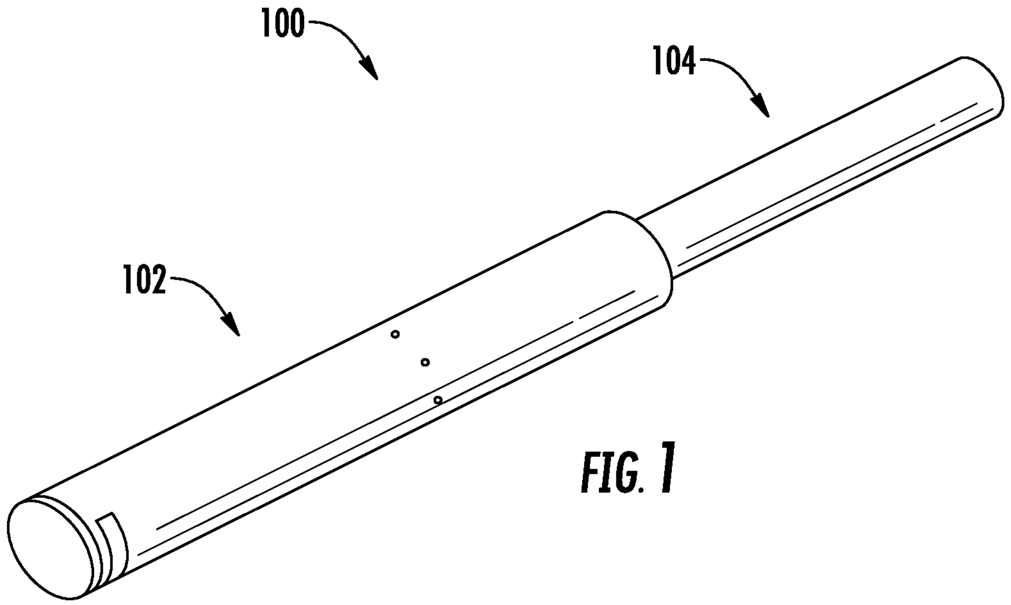
FIG. 1 illustrates a perspective view of an aerosol delivery device comprising a control body and an aerosol source member, wherein the aerosol source member and the control body are coupled to one another according to an example implementation of the present disclosure.

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, example implementations of the present disclosure relate to aerosol delivery devices. Aerosol delivery devices according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery devices does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery devices may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery devices may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

While the systems are generally described herein in terms of implementations associated with aerosol delivery devices such as so-called "e-cigarettes," it should be understood that the mechanisms, components, features, and methods may be embodied in many different forms and associated with a variety of articles. For example, the description provided herein may be employed in conjunction with implementations of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of implementations relating to aerosol delivery devices by way of example only, and may be embodied and used in various other products and methods.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable battery and/or rechargeable supercapacitor, and various electronics for controlling the operation of that article), and at the other end and removably coupleable thereto, an outer body or shell containing a disposable portion (e.g., a disposable flavor-containing cartridge). More specific formats, configurations and arrangements of components within the single housing type of unit or within a multi-piece separable housing type of unit will be evident in light of the further disclosure provided herein. Additionally, various aerosol delivery device designs and component arrangements can be appreciated upon consideration of the commercially available electronic aerosol delivery devices.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component, which alone or in combination with one or more further elements may be commonly referred to as an "atomizer"), and an aerosol source member that includes an inhalable substance medium capable of yielding an aerosol upon application of sufficient heat. In various implementations, the aerosol source member may include and a mouth end or tip configured to allow drawing upon the aerosol delivery device for aerosol inhalation (e.g., a defined airflow path through the article such that aerosol generated can be withdrawn therefrom upon draw).

Alignment of the components within the aerosol delivery device of the present disclosure can vary. In specific implementations, the inhalable substance medium may be positioned proximate a heating element so as to maximize aerosol delivery to the user. Other configurations, however, are not excluded. Generally, the heating element may be positioned sufficiently near the inhalable substance medium so that heat from the heating element can volatilize the inhalable substance medium (as well as, in some embodiments, one or more flavorants, medicaments, or the like that may likewise be provided for delivery to a user) and form an aerosol for delivery to the user. When the heating element heats the inhalable substance medium, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device of various implementations may incorporate a battery or other electrical power source to provide current flow sufficient to provide various functionalities to the aerosol delivery device, such as powering of a heating element, powering of control systems, powering of indicators, and the like. The power source can take on various implementations. Preferably, the power source is able to deliver sufficient power to rapidly activate the heating source to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices.

Aerosol delivery devices may be configured to heat an inhalable substance medium to produce an aerosol. In some implementations, the aerosol delivery devices may comprise heat-not-burn devices, configured to heat an extruded structure and/or substrate, a substrate material associated with an aerosol precursor composition, tobacco and/or a tobacco-derived material (i.e., a material that is found naturally in tobacco that is isolated directly from the tobacco or synthetically prepared) in a solid or liquid form (e.g., beads, shreds, a wrap, a fibrous sheet or paper), or the like. Such aerosol delivery devices may include so-called electronic cigarettes.

Regardless of the type of inhalable substance medium heated, some aerosol delivery devices may include a heating element configured to heat the inhalable substance medium.

In some devices, the heating element may comprise a resistive heating element. Resistive heating elements may be configured to produce heat when an electrical current is directed therethrough. Such heating elements often comprise a metal material and are configured to produce heat as a result of the electrical resistance associated with passing an electrical current therethrough. Such resistive heating elements may be positioned in proximity to the inhalable substance medium. Alternatively, the heating element may be positioned in contact with a solid or semi-solid aerosol precursor composition. Such configurations may heat the inhalable substance medium to produce an aerosol. Representative types of solid and semi-solid aerosol precursor compositions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. patent application Ser. No. 14/755,205 to Nordskog et al., filed Jun. 30, 2015, all of which are incorporated by reference herein.

Although the above-described aerosol delivery devices may be employed to heat an inhalable substance medium to produce an aerosol, such configurations may suffer from one or more disadvantages. In this regard, resistive heating elements may comprise a wire defining one or more coils that contact the inhalable substance medium. However, as a result of the coils defining a relatively small surface area, some of the inhalable substance medium may be heated to an unnecessarily high extent during aerosolization, thereby wasting energy. Alternatively or additionally, some of the inhalable substance medium that is not in contact with the coils of the heating element may be heated to an insufficient extent for aerosolization. Accordingly, insufficient aerosolization may occur, or aerosolization may occur with wasted energy.

Further, as noted above, resistive heating elements produce heat when electrical current is directed therethrough. Accordingly, as a result of positioning the heating element in contact with the inhalable substance medium, charring of the inhalable substance medium may occur. Such charring may occur as a result of the heat produced by the heating element and/or as a result of electricity traveling through the inhalable substance medium at the heating element. Charring may result in build-up of material on the heating element. Such material build-up may negatively affect the taste of the aerosol produced from the aerosol precursor composition.

Thus, implementations of the present disclosure are directed to aerosol delivery devices which may avoid some or all of the problems noted above. In various implementations, aerosol delivery devices of the present disclosure may include a control body and an aerosol source member. The control body may be reusable, whereas the aerosol source member may be configured for a limited number of uses and/or configured to be disposable. In various implementations the aerosol source member may include the inhalable substance medium. In order to heat the inhalable substance medium, at least a portion of an inductive heat source may be positioned in the control body. As will be described in more detail below, in some implementations, the entire inductive heat source may be positioned in the control body, while in other implementations, a portion of the inductive heat source may be positioned in the control body and a portion of the inductive heat source may be positioned in the aerosol source member. In various implementations, the control body may include a power source, which may be rechargeable or replaceable, and thereby the control body may be reused with multiple aerosol source members.

Figure 2:
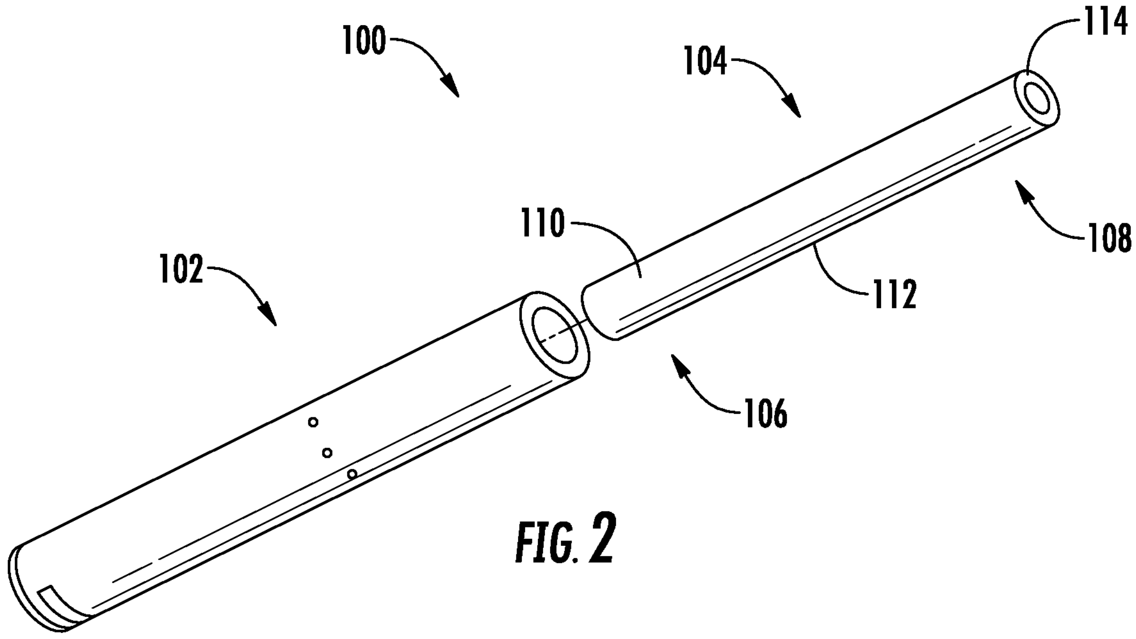
FIG. 2 illustrates a perspective view of the aerosol delivery device of FIG. 1 wherein the aerosol source member and the control body are decoupled from one another according to an example implementation of the present disclosure.

In this regard, FIG. 1 illustrates an aerosol delivery device 100 according to an example implementation of the present disclosure. The aerosol delivery device 100 may include a control body 102 and an aerosol source member 104. In various implementations, the aerosol source member and the control body can be permanently or detachably aligned in a functioning relationship. In this regard, FIG. 1 illustrates the aerosol delivery device in a coupled configuration, whereas FIG. 2 illustrates the aerosol delivery device in a decoupled configuration. Various mechanisms may connect the aerosol source member to the control body to result in a threaded engagement, a press-fit engagement, an interference fit, a sliding fit, a magnetic engagement, or the like. In various implementations, the control body of the aerosol delivery device may be substantially rod-like, substantially tubular shaped, or substantially cylindrically shaped (such as, for example, the implementations of the present disclosure shown in FIGS. 1-6 and 9-10). In other implementations, the control body may take another hand-held shape, such as a small box shape (for example, the implementations shown in FIGS. 11-13).

In specific implementations, one or both of the control body 102 and the aerosol source member 104 may be referred to as being disposable or as being reusable. For example, the control body may have a replaceable battery or a rechargeable battery, solid-state battery, thin-film solid-state battery, rechargeable supercapacitor or the like, and thus may be combined with any type of recharging technology, including connection to a wall charger, connection to a car charger (i.e., cigarette lighter receptacle), and connection to a computer, such as through a universal serial bus (USB) cable or connector (e.g., USB 2.0, 3.0, 3.1, USB Type-C), connection to a photovoltaic cell (sometimes referred to as a solar cell) or solar panel of solar cells, or wireless radio frequency (RF) based charger. Further, in some implementations, the aerosol source member 104 may comprise a single-use device. A single use cartridge for use with a control body is disclosed in U.S. Pat. No. 8,910,639 to Chang et al., which is incorporated herein by reference in its entirety.

In various implementations of the present disclosure, the aerosol source member may comprise a heated end 106, which is configured to be inserted into the control body 102, and a mouth end 108, upon which a user draws to create the aerosol. In various implementations, at least a portion of the heated end 106 may include the inhalable substance medium 110. The inhalable substance medium may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various embodiments, the aerosol source member 104, or a portion thereof, may be wrapped in an overwrap material 112, which may be formed of any material useful for providing additional structure and/or support for the aerosol source member 104. In various implementations, the overwrap material may comprise a material that resists transfer of heat, which may include a paper or other fibrous material, such as a cellulose material. The overwrap material may also include at least one filler material imbedded or dispersed within the fibrous material. In various implementations, the filler material may have the form of water insoluble particles. Additionally, the filler material can incorporate inorganic components. In various implementations, the overwrap may be formed of multiple layers, such as an underlying, bulk layer and an overlying layer, such as a typical wrapping paper in a cigarette. Such materials may include, for example, lightweight "rag fibers" such as flax, hemp, sisal, rice straw, and/or esparto.

In various implementations, the mouth end of the aerosol source member 104 may include a filter 114, which may be made of a cellulose acetate or polypropylene material. In various implementations, the filter 114 may increase the structural integrity of the mouth end of the aerosol source member, and/or provide filtering capacity, if desired, and/or provide resistance to draw. For example, an article according to the invention can exhibit a pressure drop of about 50 to about 250 mm water pressure drop at 17.5 cc/second air flow. In further implementations, pressure drop can be about 60 mm to about 180 mm or about 70 mm to about 150 mm. Pressure drop value may be measured using a Filtrona Filter Test Station (CTS Series) available from Filtrona Instruments and Automation Ltd or a Quality Test Module (QTM) available from the Cerulean Division of Molins, PLC. The thickness of the filter along the length of the mouth end of the aerosol source member can vary—e.g., about 2 mm to about 20 mm, about 5 mm to about 20 mm, or about 10 mm to about 15 mm. In some implementations, the filter may be separate from the overwrap, and the filter may be held in position by the overwrap.

Exemplary types of overwrapping materials, wrapping material components, and treated wrapping materials that may be used in overwrap in the present disclosure are described in U.S. Pat. No. 5,105,838 to White et al.; U.S. Pat. No. 5,271,419 to Arzonico et al.; U.S. Pat. No. 5,220,930 to Gentry; U.S. Pat. No. 6,908,874 to Woodhead et al.; U.S. Pat. No. 6,929,013 to Ashcraft et al.; U.S. Pat. No. 7,195,019 to Hancock et al.; U.S. Pat. No. 7,276,120 to Holmes; U.S. Pat. No. 7,275,548 to Hancock et al.; PCT WO 01/08514 to Fournier et al.; and PCT WO 03/043450 to Hajaligol et al., which are incorporated herein by reference in their entireties. Representative wrapping materials are commercially available as R. J. Reynolds Tobacco Company Grades 119, 170, 419, 453, 454, 456, 465, 466, 490, 525, 535, 557, 652, 664, 672, 676 and 680 from Schweitzer-Maudit International. The porosity of the wrapping material can vary, and frequently is between about 5 CORESTA units and about 30,000 CORESTA units, often is between about 10 CORESTA units and about 90 CORESTA units, and frequently is between about 8 CORESTA units and about 80 CORESTA units.

To maximize aerosol and flavor delivery which otherwise may be diluted by radial (i.e., outside) air infiltration through the overwrap, one or more layers of non-porous cigarette paper may be used to envelop the aerosol source member (with or without the overwrap present). Examples of suitable non-porous cigarette papers are commercially available from Kimberly-Clark Corp. as KC-63-5, P878-5, P878-16-2 and 780-63-5. Preferably, the overwrap is a material that is substantially impermeable to the vapor formed during use of the inventive article. If desired, the overwrap can comprise a resilient paperboard material, foil-lined paperboard, metal, polymeric materials, or the like, and this material can be circumscribed by a cigarette paper wrap. The overwrap may comprise a tipping paper that circumscribes the component and optionally may be used to attach a filter material to the aerosol source member, as otherwise described herein.

In various implementations other components may exist between the inhalable substance medium and the mouth end of the aerosol source member, wherein the mouth end may include a filter. For example, in some implementations one or any combination of the following may be positioned between the inhalable substance medium and the mouth end: an air gap; phase change materials for cooling air; flavor releasing media; ion exchange fibers capable of selective chemical adsorption; aerogel particles as filter medium; and other suitable materials. Various implementations of the present disclosure employ an inductive heat source to heat the inhalable substance medium. The inductive heat source may comprise a resonant transformer, which may comprise a resonant transmitter and a resonant receiver. In various implementations, one or both of the resonant transmitter and resonant receiver may be located in the control body and/or the aerosol source member. In some instances, the inhalable substance medium may include a plurality of beads or particles imbedded in, or otherwise part of, the inhalable substance medium that may serve as, or facilitate the function of, a resonant receiver.

Figure 3:
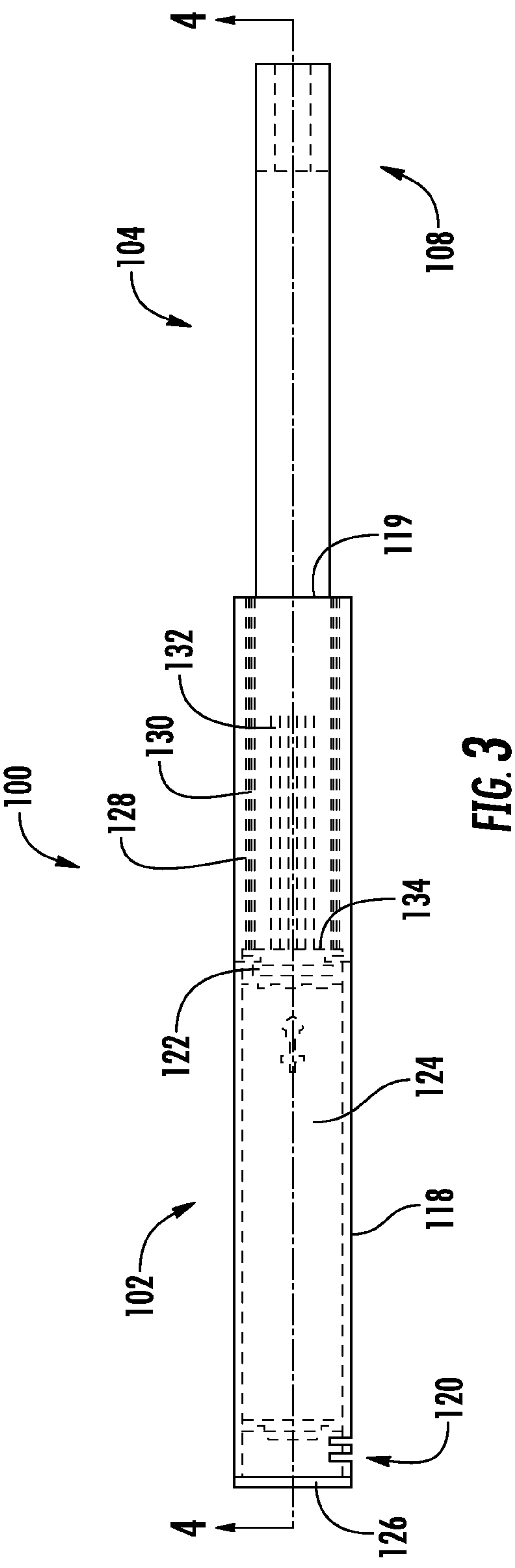
FIG. 3 illustrates a front view of an aerosol delivery device according to an example implementation of the present disclosure.
Figure 4:
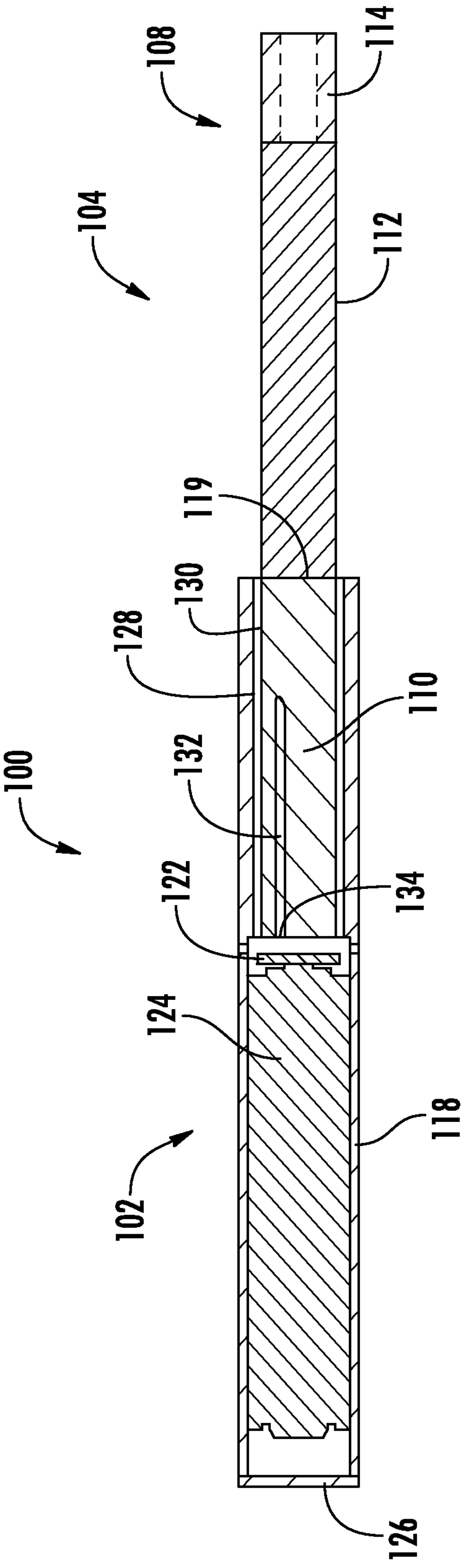
FIG. 4 illustrates a sectional view through the aerosol delivery device of FIG. 3.

FIG. 3 illustrates a front view of an aerosol delivery device according to an example implementation of the present disclosure, and FIG. 4 illustrates a sectional view through the aerosol delivery device of FIG. 3. As illustrated in these figures, the aerosol delivery device 100 of this example implementation includes a resonant transformer comprising a resonant transmitter and a resonant receiver. In particular, the control body 102 of the depicted implementation may comprise a housing 118 that includes an opening 119 defined in an engaging end thereof, a flow sensor 120 (e.g., a puff sensor or pressure switch), a control component 122 (e.g., a microprocessor, individually or as part of a microcontroller, a printed circuit board (PCB) that includes a microprocessor and/or microcontroller, etc.), a power source 124 (e.g., a battery, which may be rechargeable, and/or a rechargeable supercapacitor), and an end cap that includes an indicator 126 (e.g., a light emitting diode (LED)).

Examples of power sources are described in U.S. Pat. No. 9,484,155 to Peckerar et al., and U.S. Pat. App. Pub. No. 2017/0112191 to Sur et al., filed Oct. 21, 2015, the disclosures of which are incorporated herein by reference in their respective entireties. With respect to the flow sensor, representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. Pat. No. 9,423,152 to Ampolini et al., which is incorporated herein by reference in its entirety.

In one implementation, the indicator 126 may comprise one or more light emitting diodes, quantum dot-based light emitting diodes or the like. The indicator 126 can be in communication with the control component 122 and be illuminated, for example, when a user draws on the aerosol source member 104, when coupled to the control body 102, as detected by the flow sensor 120.

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and PCT Pat. App. Pub. No. WO 2010/003480 by Flick discloses a fluid flow sensing system indicative of a puff in an aerosol generating system; all of the foregoing disclosures being incorporated herein by reference in their entireties.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference in its entirety. Further, U.S. patent application Ser. No. 14/881,392 to Worm et al., filed Oct. 13, 2015, discloses capsules that may be included in aerosol delivery devices and fob-shape configurations for aerosol delivery devices, and is incorporated herein by reference in its entirety. A variety of the materials disclosed by the foregoing documents may be incorporated into the present devices in various implementations, and all of the foregoing disclosures are incorporated herein by reference in their entireties.

The control body 102 of the implementation depicted in FIGS. 3 and 4 includes a resonant transmitter, and a resonant receiver, which together form the resonant transformer. The resonant transformer of various implementations of the present disclosure may take a variety of forms, including implementations where one or both of the resonant transmitter and resonant receiver are located in the control body or the aerosol delivery device. In the particular implementation depicted in FIGS. 3 and 4, the resonant transmitter comprises a laminate that includes a foil material 128 that surrounds a support cylinder 130, and the resonant receiver of the depicted embodiment comprises a plurality of receiver prongs 132 that extend from a receiver base member 134. In some implementations, the foil material may include an electrical trace printed thereon, such as, for example, one or more electrical traces that may, in some implementations, form a helical pattern when the foil material is positioned around the resonant receiver. In various implementations, the resonant receiver and the resonant transmitter may be constructed of one or more conductive materials, and in further implementations the resonant receiver may be constructed of a ferromagnetic material including, but not limited to, cobalt, iron, nickel, and combinations thereof. In the illustrated implementation, the foil material 128 is constructed of a conductive material and the receiver prongs 132 are constructed of a ferromagnetic material. In various implementations, the receiver base member 134 may be constructed of a non-conductive and/or insulating material.

As illustrated, the resonant transmitter may extend proximate an engagement end of the housing 118, and may be configured to substantially surround the portion of the heated end 106 of the aerosol source member 104 that includes the inhalable substance medium 110. In such a manner, the resonant transmitter of the illustrated implementation may define a tubular configuration. As illustrated in FIGS. 3 and 4, the resonant transmitter may surround the support cylinder 130. The support cylinder 130 may also define a tubular configuration, and may be configured to support the foil material 128 such that the foil material 128 does not move into contact with, and thereby short-circuit with, the receiver prongs 132. In such a manner, the support cylinder 130 may comprise a nonconductive material, which may be substantially transparent to an oscillating magnetic field produced by the foil material 128. In various implementations, the foil material may be imbedded in, or otherwise coupled to, the support cylinder. In the illustrated implementation, the foil material 128 is engaged with an outer surface of the support cylinder 130; however, in other implementations, the foil material may be positioned at an inner surface of the support cylinder or be fully imbedded in the support cylinder.

In the illustrated implementation, the support cylinder 130 may also serve to facilitate proper positioning of the aerosol source member 104 when the aerosol source member 104 is inserted into the housing 118. In particular, the support cylinder 130 may extend from the opening 119 of the housing 118 to the receiver base member 134. In the illustrated implementation, an inner diameter of the support cylinder 130 may be slightly larger than or approximately equal to an outer diameter of a corresponding aerosol source member 104 (e.g., to create a sliding fit) such that the support cylinder 130 guides the aerosol source member 104 into the proper position (e.g., lateral position) with respect to the control body 102. In the illustrated implementation, the control body 102 is configured such that when the aerosol source member 104 is inserted into the control body 102, the receiver prongs 132 are located in the approximate radial center of the heated end 106 of the aerosol source member 104. In such a manner, when used in conjunction with an extruded inhalable substance medium that defines a tube structure, the receiver prongs are located inside of a cavity defined by an inner surface of the extruded tube structure, and thus do not contact the inner surface of the extruded tube structure.

In various implementations, the transmitter support member may engage an internal surface of the housing to provide for alignment of the support member with respect to the housing. Thereby, as a result of the fixed coupling between the support member and the resonant transmitter, a longitudinal axis of the resonant transmitter may extend substantially parallel to a longitudinal axis of the housing. In various implementations, the resonant transmitter may be positioned out of contact with the housing, so as to avoid transmitting current from the transmitter coupling device to the outer body. In some implementations, an insulator may be positioned between the resonant transmitter and the housing, so as to prevent contact therebetween. As may be understood, the insulator and the support member may comprise any nonconductive material such as an insulating polymer (e.g., plastic or cellulose), glass, rubber, ceramic, and porcelain. Alternatively, the resonant transmitter may contact the housing in implementations in which the housing is formed from a nonconductive material such as a plastic, glass, rubber, ceramic, or porcelain.

Figure 5:
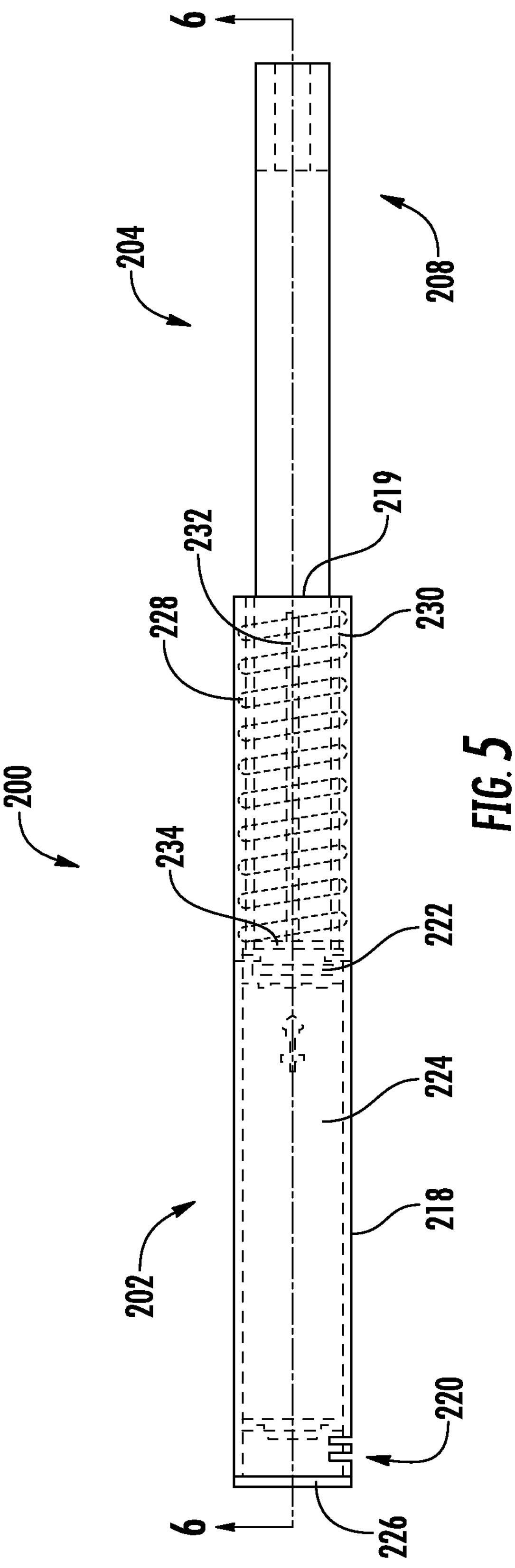
FIG. 5 illustrates a front view of an aerosol delivery device according to an example implementation of the present disclosure.
Figure 6:
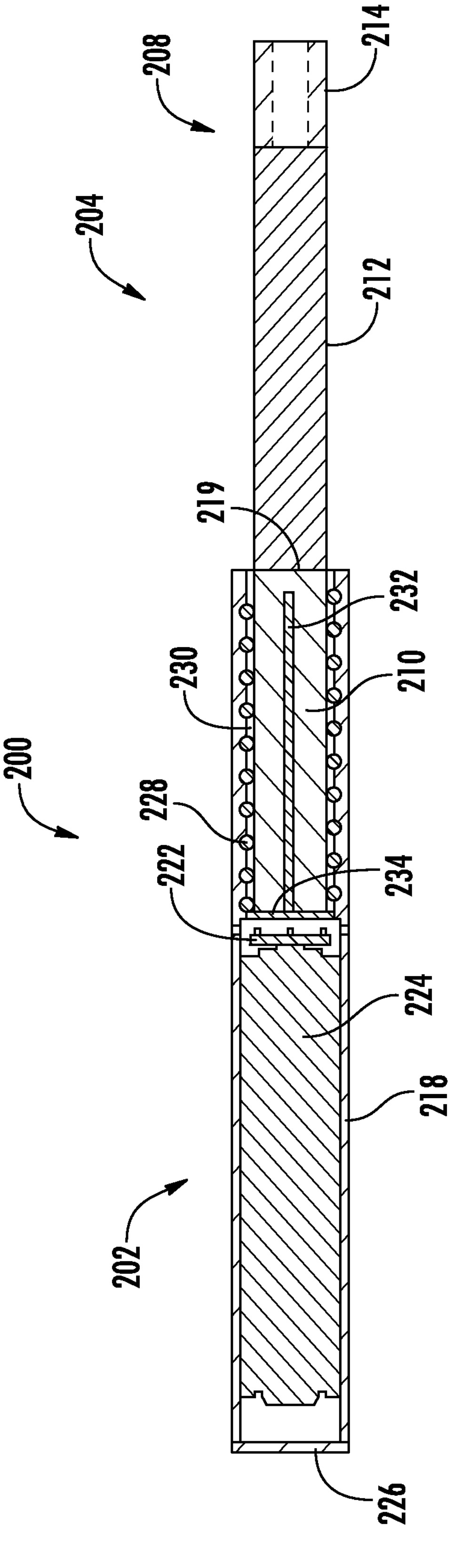
FIG. 6 illustrates a sectional view through the aerosol delivery device of FIG. 5.

An alternate implementation is illustrated in FIGS. 5 and 6. Similar to the implementation described with respect to FIGS. 3 and 4, the implementation depicted in FIGS. 5 and 6 includes an aerosol delivery device 200 comprising a control body 202 that is configured to receive an aerosol source member 204. As noted above, the aerosol source member 204 may comprise a heated end, which is configured to be inserted into the control body 202, and a mouth end 208, upon which a user draws to create the aerosol. At least a portion of the heated end may include an inhalable substance medium 210, which may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various implementations, the aerosol source member 204, or a portion thereof, may be wrapped in an overwrap material 212, which may be formed of any material useful for providing additional structure and/or support for the aerosol source member 204. In various implementations, the overwrap material may comprise a material that resists transfer of heat, which may include a paper or other fibrous material, such as a cellulose material. Various configurations of possible overwrap materials are described with respect to the example implementation of FIGS. 3 and 4 above.

In various implementations, the mouth end of the aerosol source member 204 may include a filter 214, which may be made of a cellulose acetate or polypropylene material. As noted above, in various implementations, the filter 214 may increase the structural integrity of the mouth end of the aerosol source member, and/or provide filtering capacity, if desired, and/or provide resistance to draw. In some embodiments, the filter may be separate from the overwrap, and the filter may be held in position near the cartridge by the overwrap. Various configurations of possible filter characteristics are described with respect to the example implementation of FIGS. 3 and 4 above.

The control body 202 may comprise a housing 218 that includes an opening 219 defined therein, a flow sensor 220 (e.g., a puff sensor or pressure switch), a control component 222 (e.g., a microprocessor, individually or as part of a microcontroller, a printed circuit board (PCB) that includes a microprocessor and/or microcontroller, etc.), a power source 224 (e.g., a battery, which may be rechargeable, and/or a rechargeable supercapacitor), and an end cap that includes an indicator 226 (e.g., a light emitting diode (LED)). As noted above, in one implementation, the indicator 226 may comprise one or more light emitting diodes, quantum dot-based light emitting diodes or the like. The indicator can be in communication with the control component 222 and be illuminated, for example, when a user draws on the aerosol source member 204, when coupled to the control body 202, as detected by the flow sensor 120. Examples of power sources, sensors, and various other possible electrical components are described above with respect to the example implementation of FIGS. 3 and 4 above.

The control body 202 of the implementation depicted in FIGS. 5 and 6 includes a resonant transmitter, and a resonant receiver, which together form the resonant transformer. The resonant transformer of various implementations of the present disclosure may take a variety of forms, including implementations where one or both of the resonant transmitter and resonant receiver are located in the control body and/or the aerosol delivery device. In the particular implementation depicted in FIGS. 5 and 6, the resonant transmitter of the depicted implementation comprises a helical coil 228 that surrounds a support cylinder 230. In various implementations, the resonant receiver and the resonant transmitter may be constructed of one or more conductive materials, and in further implementations the resonant receiver may be constructed of a ferromagnetic material including, but not limited to, cobalt, iron, nickel, and combinations thereof. In the illustrated implementation, the helical coil 228 is constructed of a conductive material. In further implementations, the helical coil may include a non-conductive insulating cover/wrap material.

The resonant receiver of the illustrated implementation comprises a single receiver prong 232 that extends from a receiver base member 234. In various implementations a receiver prong, whether a single receiver prong, or part of a plurality of receiver prongs, may have a variety of different geometric configurations. For example, in some implementations the receiver prong may have a cylindrical cross-section, which, in some implementations may comprise a solid structure, and in other implementations, may comprise a hollow structure. In other implementations, the receiver prong may have a square or rectangular cross-section, which, in some implementations, may comprise a solid structure, and in other implementations, may comprise a hollow structure. In various implementations, the receiver prong may be constructed of a conductive material. In the illustrated implementation, the receiver prong 232 is constructed of a ferromagnetic material including, but not limited to, cobalt, iron, nickel, and combinations thereof. In various implementations, the receiver base member 234 may be constructed of a non-conductive and/or insulating material.

As illustrated, the resonant transmitter may extend proximate an engagement end of the housing 218, and may be configured to substantially surround the portion of the heated end of the aerosol source member 204 that includes the inhalable substance medium 210. As illustrated in FIGS. 5 and 6, the resonant transmitter may surround a support cylinder 230. The support cylinder 230, which may define a tubular configuration, may be configured to support the helical coil 228 such that the coil does not move into contact with, and thereby short-circuit with, the resonant receiver prong 232. In such a manner, the support cylinder 230 may comprise a nonconductive material, which may be substantially transparent to an oscillating magnetic field produced by the helical coil. In various implementations, the helical coil 228 may be imbedded in, or otherwise coupled to, the support cylinder 230. In the illustrated implementation, the helical coil 228 is engaged with an outer surface of the support cylinder 230; however, in other implementations, the helical coil may be positioned at an inner surface of the support cylinder or be fully imbedded in the support cylinder.

In the illustrated implementation, the support cylinder 230 may also serve to facilitate proper positioning of the aerosol source member 204 when the aerosol source member 204 is inserted into the housing. In particular, the support cylinder 230 may extend from the opening 219 of the housing 218 to the receiver base member 234. In the illustrated implementation, an inner diameter of the transmitter source cylinder 230 may be slightly larger than or approximately equal to an outer diameter of a corresponding aerosol source member 204 (e.g., to create a sliding fit) such that the support cylinder 230 guides the aerosol source member 204 into the proper position (e.g., lateral position) with respect to the control body 202. In the illustrated implementation, the control body 202 is configured such that when the aerosol source member 204 is inserted into the control body 202, the receiver prong 232 are located in the approximate radial center of the heated end of the aerosol source member 204. In such a manner, when used in conjunction with an extruded inhalable substance medium that defines a tube structure, the receiver prong is located inside of a cavity defined by an inner surface of the extruded tube structure, and thus does not contact the inner surface of the extruded tube structure.

Figure 14:
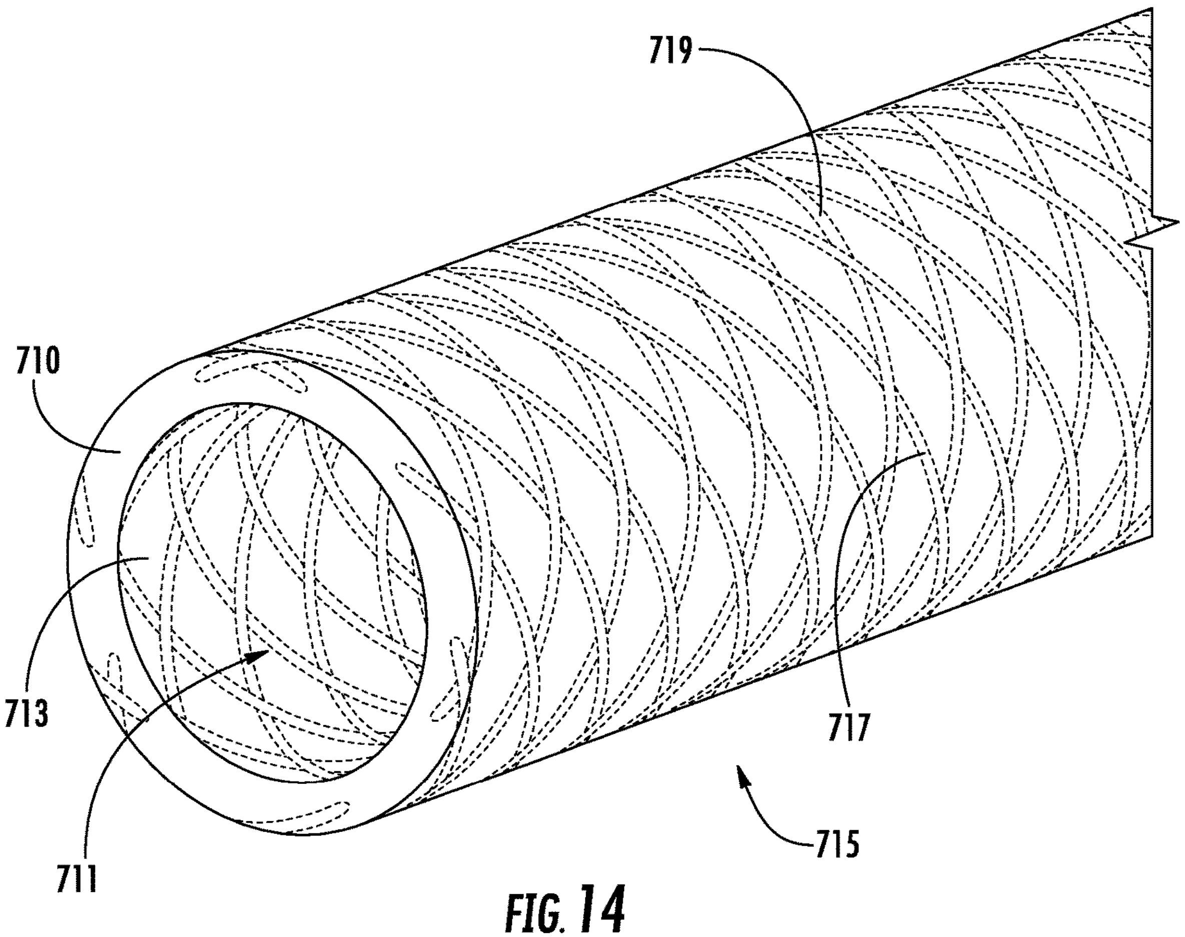
FIG. 14 illustrates a perspective view of an inhalable substance medium according to another example implementation of the present disclosure.

It should be noted that in some implementations, the resonant receiver may be a part of an aerosol source member, such as for example, as a part of the inhalable substance medium of an aerosol source member. Such implementations may or may not include an additional resonant receiver that is part of the control body. For example, FIG. 14 illustrates a perspective view of an inhalable substance medium 710 according to another example implementation of the present disclosure. In the depicted implementation, the inhalable substance medium 710 comprises an extruded tube that includes a cavity 711 defined by an inner surface 713. Embedded into the extruded tube is a braided wire structure 715 that comprises a series of cross wires 717, 719 that are interwoven to create the structure 715. In various implementations, the wires 717, 719 may be constructed of any one or more conductive materials, and further may be constructed of one or more ferromagnetic materials including, but not limited to, cobalt, iron, nickel, and combinations thereof. In various implementations the braided wire structure may be proximate the inner surface or outer surface of the inhalable substance medium, or, as shown in FIG. 14, may be located within the extruded tube structure.

In various implementations, the transmitter support member may engage an internal surface of the housing to provide for alignment of the support member with respect to the housing. Thereby, as a result of the fixed coupling between the support member and the resonant transmitter, a longitudinal axis of the resonant transmitter may extend substantially parallel to a longitudinal axis of the housing. In various implementations, the resonant transmitter may be positioned out of contact with the housing, so as to avoid transmitting current from the transmitter coupling device to the outer body. In some implementations, an insulator may be positioned between the resonant transmitter and the housing, so as to prevent contact therebetween. As may be understood, the insulator and the support member may comprise any nonconductive material such as an insulating polymer (e.g., plastic or cellulose), glass, rubber, ceramic, and porcelain. Alternatively, the resonant transmitter may contact the housing in implementations in which the housing is formed from a nonconductive material such as a plastic, glass, rubber, ceramic, or porcelain.

Figure 7:
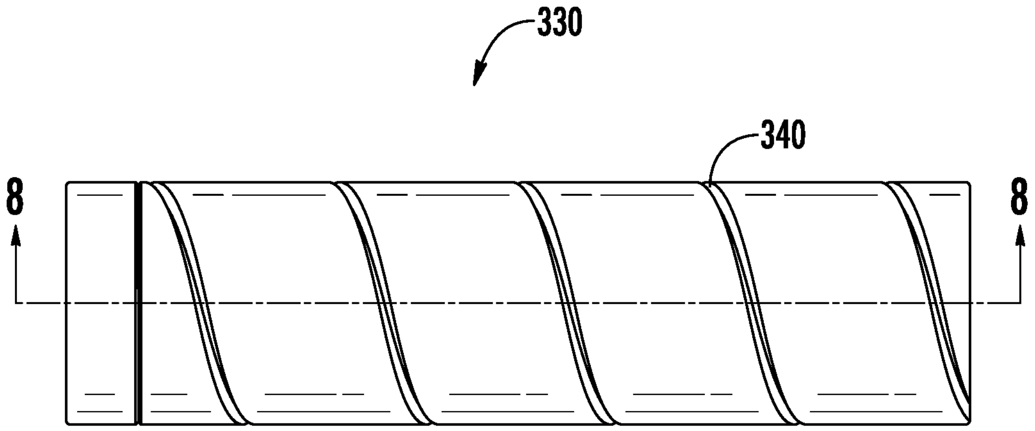
FIG. 7 illustrates a front view of a support cylinder according to an example implementation of the present disclosure.
Figure 8:
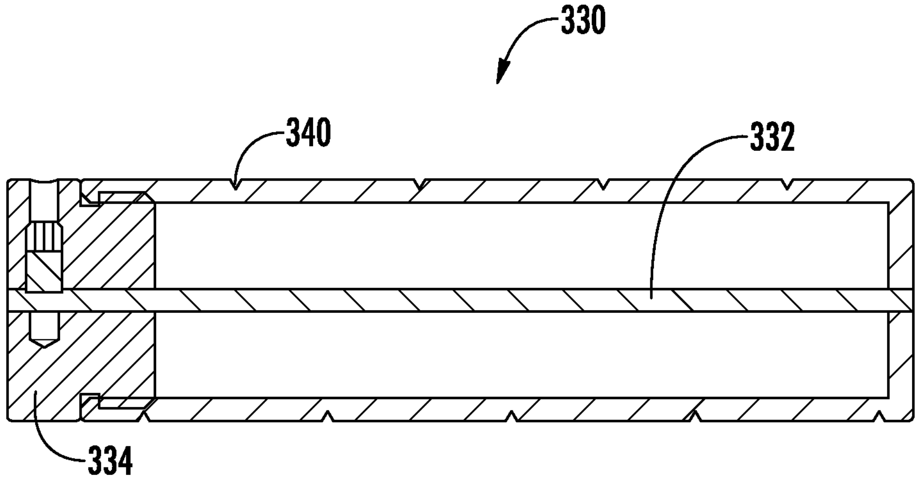
FIG. 8 illustrates a sectional view through the support cylinder of FIG. 7.

Although in some implementations, the support cylinder and the receiver base member may comprise separate components, in other implementations, the support cylinder and the receiver base member may be integral components. For example, FIG. 7 illustrates a front view of a support cylinder 330 according to an example implementation of the present disclosure. FIG. 8 illustrates a sectional view through the support cylinder 330 of FIG. 7. As depicted in the figures, the support cylinder 330 comprises a tube configuration configured to support a resonant transmitter, such as, for example, a helical coil. In such a manner, an outer surface of the support cylinder 330 may include one or more coil grooves 340 that may be configured to guide, contain, or otherwise support a resonant transmitter such as a transmitter coil. As depicted in FIG. 8, the support cylinder 330 may integrate with a receiver base member 334, which may be attached at one end of the support cylinder 330. Further, in various implementations a resonant receiver, such as in the case of the illustrated implementation, a single receiver prong 332 may be contained by and extend from the receiver base member 334. In various implementations, the support cylinder 330 and resonant receiver (in the illustrated implementation, the receiver prong 332) may be constructed of different materials so as to avoid creating a short-circuit with the resonant transmitter. In particular, the support cylinder 330 may comprise a nonconductive material such as an insulating polymer (e.g., plastic or cellulose), glass, rubber, ceramic, porcelain, and combinations thereof, while the resonant receiver (in the illustrated implementation, the receiver prong 332) may comprise a conductive material. In various implementations, the resonant receiver (in the depicted implementation the receiver prong 332) may be constructed of a ferromagnetic material including, but not limited to, cobalt, iron, nickel, and combinations thereof.

In the illustrated implementation, the support cylinder is configured such that a resonant transmitter, such as a helical coil, may engage with an outer surface of the support cylinder; however, in other implementations, the support cylinder may be configured such that a resonant a transmitter may be positioned at an inner surface of the transmitter support cylinder or fully imbedded in the support cylinder.

Figure 9:
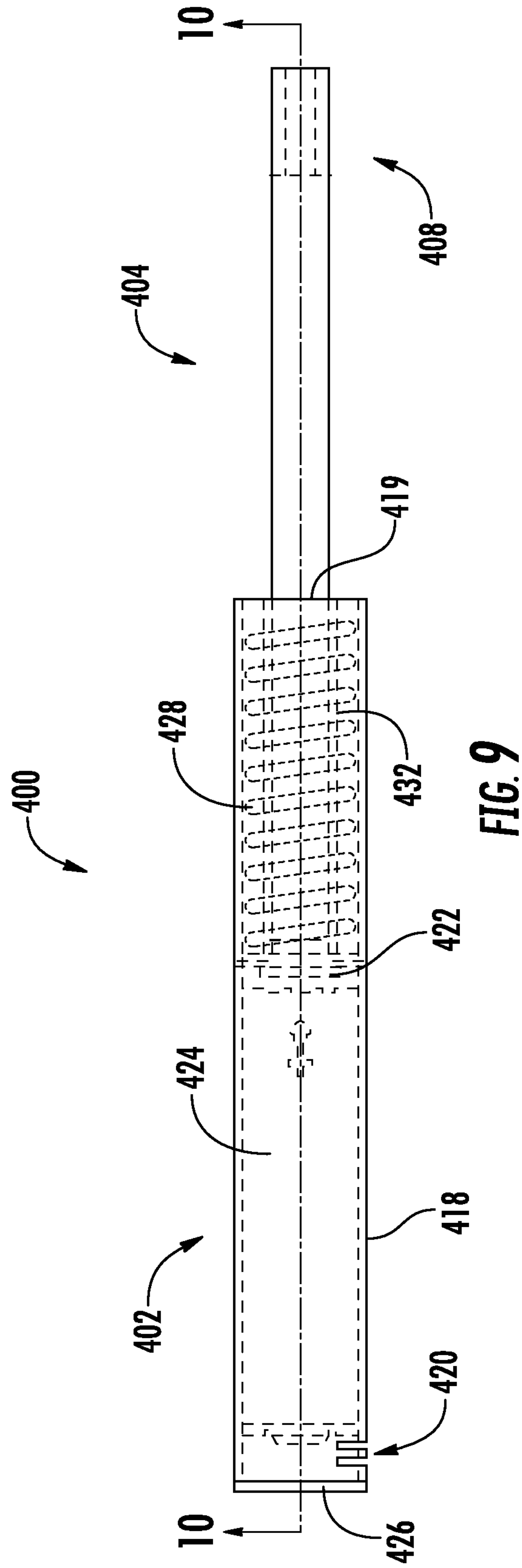
FIG. 9 illustrates a front view of a support cylinder according to an example implementation of the present disclosure.
Figure 10:
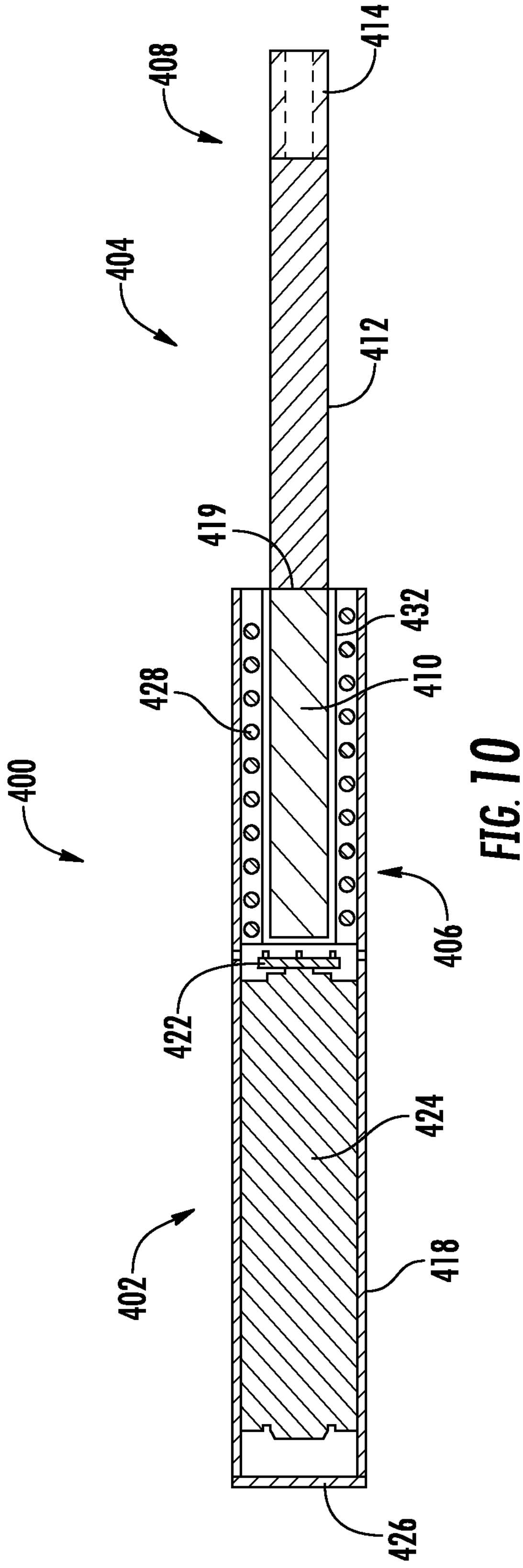
FIG. 10 illustrates a sectional view through the support cylinder of FIG. 9.

An alternate implementation is illustrated in FIGS. 9 and 10. Similar to the implementation described with respect to FIGS. 3-6, the implementation depicted in FIGS. 9 and 10 includes an aerosol delivery device 400 comprising a control body 402 that is configured to receive an aerosol source member 404. As noted above, the aerosol source member 404 may comprise a heated end 406 (see FIG. 10), which is configured to be inserted into the control body 402, and a mouth end 408, upon which a user draws to create the aerosol. At least a portion of the heated end 406 may include an inhalable substance medium 410 (see FIG. 10), which may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various implementations, the aerosol source member 404, or a portion thereof, may be wrapped in an overwrap material 412 (see FIG. 10), which may be formed of any material useful for providing additional structure and/or support for the aerosol source member 404. Various configurations of possible overwrap materials are described with respect to the example implementation of FIGS. 3 and 4 above.

In various implementations, the mouth end of the aerosol source member 404 may include a filter 414 (see FIG. 10), which may be made of a cellulose acetate or polypropylene material. As noted above, in various implementations, the filter may increase the structural integrity of the mouth end of the aerosol source member, and/or provide filtering capacity, if desired, and/or provide resistance to draw. In some embodiments, the filter may be separate from the overwrap, and the filter may be held in position near the cartridge by the overwrap. Various configurations of possible filter characteristics are described with respect to the example implementation of FIGS. 3 and 4 above.

The control body 402 may comprise a housing 418 that includes an opening 419 defined therein, a flow sensor 420 (e.g., a puff sensor or pressure switch), a control component 422 (e.g., a microprocessor, individually or as part of a microcontroller, a printed circuit board (PCB) that includes a microprocessor and/or microcontroller, etc.), a power source 424 (e.g., a battery, which may be rechargeable, and/or a rechargeable supercapacitor), and an end cap that includes an indicator 426 (e.g., a light emitting diode (LED)). As noted above, in one implementation, the indicator 426 may comprise one or more light emitting diodes, quantum dot-based light emitting diodes or the like. The indicator can be in communication with the control component 422 and be illuminated, for example, when a user draws on the aerosol source member 404, when coupled to the control body 402, as detected by the flow sensor 420. Examples of power sources, sensors, and other possible electrical components are described above with respect to the example implementation of FIGS. 3 and 4.

The control body 402 of the implementation depicted in FIGS. 9 and 10 includes a resonant transmitter, and a resonant receiver, which together form the resonant transformer. The resonant transformer of various implementations of the present disclosure may take a variety of forms, including implementations where one or both of the resonant transmitter and resonant receiver are located in the control body and/or the aerosol delivery device. In the particular implementation depicted in FIGS. 9 and 10, the resonant transmitter of the depicted implementation comprises a helical coil 428. In various implementations, the resonant receiver and the resonant transmitter may be constructed of one or more conductive materials, and in further implementations the resonant receiver may be constructed of a ferromagnetic material including, but not limited to, cobalt, iron, nickel, and combinations thereof. In the illustrated implementation, the helical coil 428 is constructed of a conductive material. In further implementations, the helical coil may include a non-conductive insulating cover/wrap material.

The resonant receiver of the depicted embodiment comprises a receiver cylinder 432. In various implementations, the receiver cylinder 432 may be constructed of a conductive material. In further implementations, the receiver cylinder 432 may be constructed of a ferromagnetic material including, but not limited to, cobalt, iron, nickel, and combinations thereof. Although in some implementations the receiver cylinder may have two open ends, in the illustrated implementation, the receiver cylinder 432 includes a closed end, which is configured to be positioned proximate an end surface of the heated end 406 of the aerosol source member 404 (i.e., the end surface opposite the end surface of the mouth end 408 of the aerosol source member).

As illustrated, the helical coil 428 may extend proximate an engagement end of the housing 418, and may be configured to substantially surround the portion of the heated end 406 of the aerosol source member 404 that includes the inhalable substance medium 410. As illustrated in FIGS. 9 and 10, the helical coil 428 may surround the receiver cylinder 432. In some implementations, an insulator (such as, for example, a cylinder or film) may be positioned between the helical coil and the receiver cylinder such that the helical coil does make contact with, and thereby short-circuit with, the receiver cylinder. In such a manner, the insulator may comprise a nonconductive material, which may be substantially transparent to an oscillating magnetic field produced by the helical coil. As may be understood, such nonconductive materials may include an insulating polymer (e.g., plastic or cellulose), glass, rubber, ceramic, and/or porcelain.

In the illustrated implementation, the receiver cylinder 432 may also serve to facilitate proper positioning of the aerosol source member 404 when the aerosol source member 404 is inserted into the housing 418. In particular, the receiver cylinder 432 may extend from the opening 419 of the housing 418. In the illustrated implementation, an inner diameter of the receiver cylinder 432 may be slightly larger than or approximately equal to an outer diameter of a corresponding aerosol source member 404 (e.g., to create a sliding fit) such that the receiver cylinder 432 guides the aerosol source member 404 into the proper position (e.g., lateral and axial position) with respect to the control body 402. In various implementations, the control body 402 may be configured such that when the aerosol source member 404 is inserted into the control body 402, the receiver cylinder 432 surrounds at least a portion of, or a majority of (e.g., more than 50%), or substantially all of, the inhalable substance medium 410 of the aerosol source member 404.

In some implementations, the receiver cylinder may also include one or more other resonant receiver features, such as, for example, one or more receiver prongs that extend within an internal area thereof. In such a manner, both the receiver cylinder and receiver prong(s) may be constructed of a conductive material, and in some implementations, one or both of the receiver cylinder and receiver prong(s) may be constructed of a ferromagnetic material.

Figure 11:
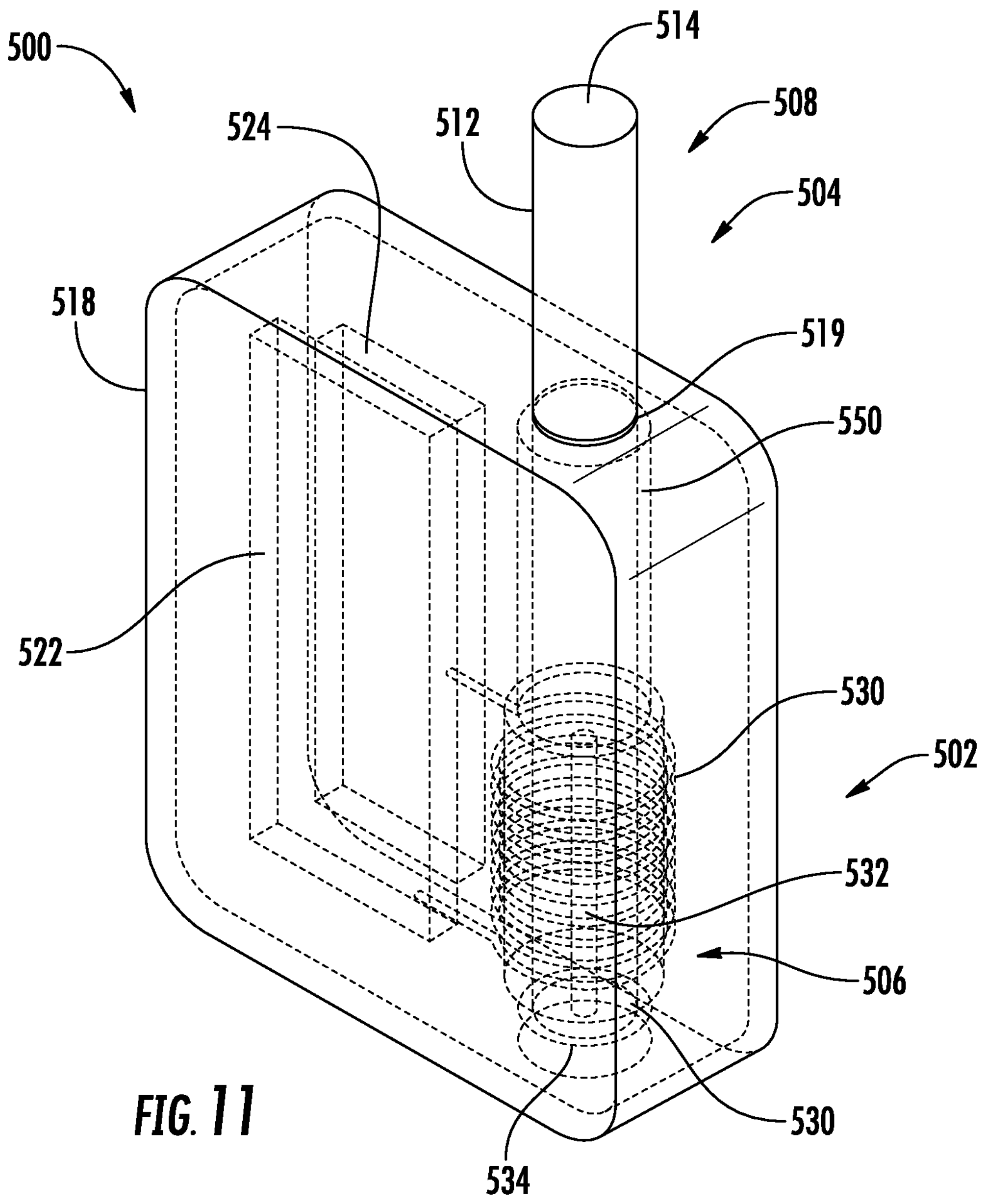
FIG. 11 illustrates a perspective view of an aerosol delivery device comprising a control body and an aerosol source member, wherein the aerosol source member and the control body are coupled to one another according to an example implementation of the present disclosure.
Figure 12:
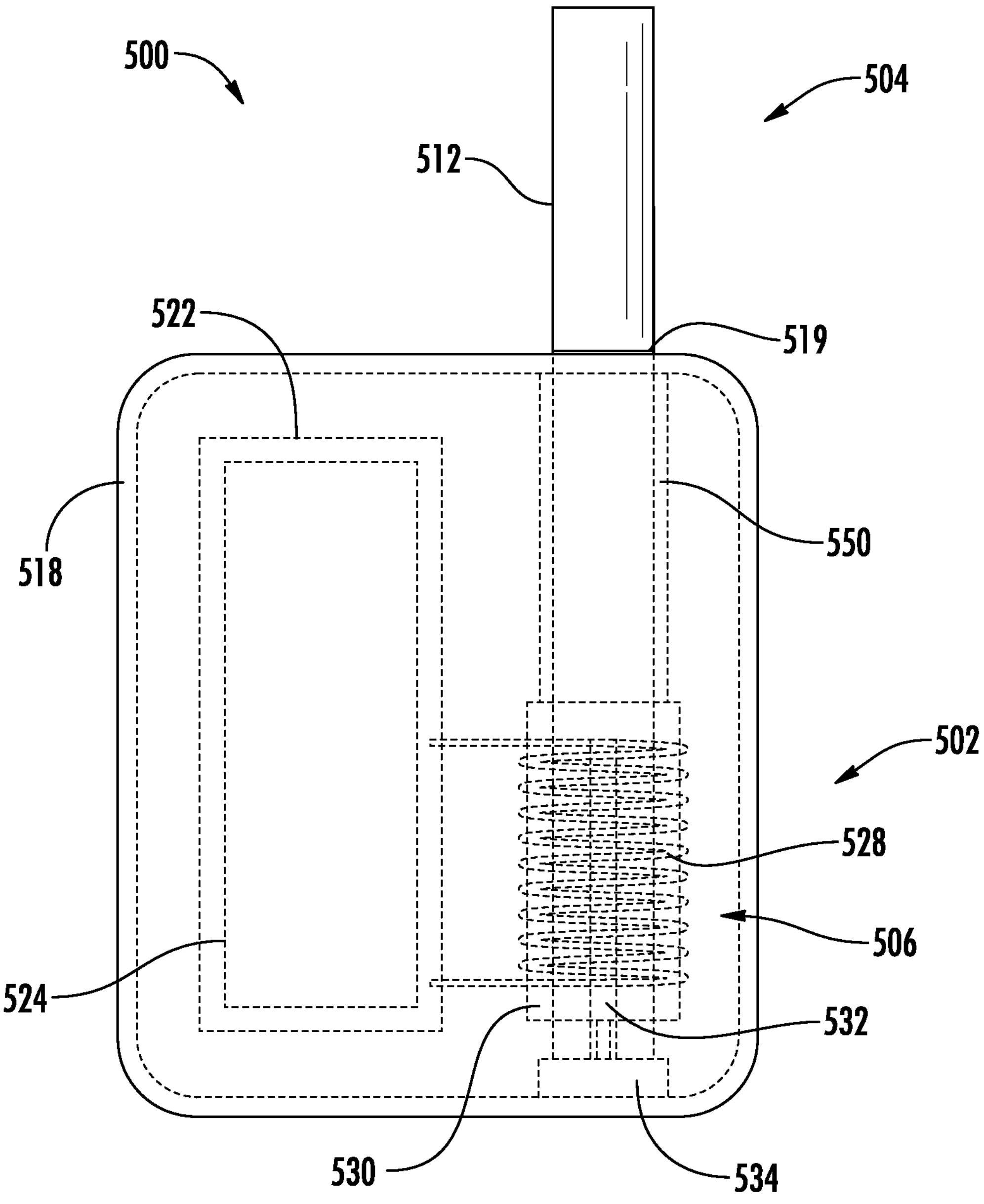
FIG. 12 illustrates a front view of the aerosol delivery device of FIG. 9.

An alternate implementation is illustrated in FIGS. 11 and 12. Similar to the implementation described with respect to FIGS. 3-6 and 9-10, the implementation depicted in FIGS. 11 and 12 includes an aerosol delivery device 500 comprising a control body 502 that is configured to receive an aerosol source member 504. As noted above, the aerosol source member 504 may comprise a heated end 506, which is configured to be inserted into the control body 502, and a mouth end 508, upon which a user draws to create the aerosol. At least a portion of the heated end 506 may include an inhalable substance medium, which may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various implementations, the aerosol source member 504, or a portion thereof, may be wrapped in an overwrap material 512, which may be formed of any material useful for providing additional structure and/or support for the aerosol source member 504. Various configurations of possible overwrap materials are described with respect to the example implementation of FIGS. 3 and 4 above.

In various implementations, the mouth end 508 of the aerosol source member 504 may include a filter 514, which may be made of a cellulose acetate or polypropylene material. As noted above, in various implementations, the filter 514 may increase the structural integrity of the mouth end of the aerosol source member, and/or provide filtering capacity, if desired, and/or provide resistance to draw. In some embodiments, the filter may be separate from the overwrap, and the filter may be held in position near the cartridge by the overwrap. Various configurations of possible filter characteristics are described with respect to the example implementation of FIGS. 3 and 4 above.

The control body 502 may comprise a housing 518 that includes an opening 519 defined therein, a flow sensor (not shown, e.g., a puff sensor or pressure switch), a control component 522 (e.g., a microprocessor, individually or as part of a microcontroller, a printed circuit board (PCB) that includes a microprocessor and/or microcontroller, etc.), and a power source 524 (e.g., a battery, which may be rechargeable, and/or a rechargeable supercapacitor). Examples of power sources, sensors, and various other possible electrical components are described above with respect to the example implementation of FIGS. 3 and 4 above.

The control body 502 of the implementation depicted in FIGS. 11 and 12 includes a resonant transmitter, and a resonant receiver, which together form the resonant transformer. The resonant transformer of various implementations of the present disclosure may take a variety of forms, including implementations where one or both of the resonant transmitter and resonant receiver are located in the control body and/or the aerosol delivery device. In the particular implementation depicted in FIGS. 11 and 12, the resonant transmitter comprises a helical coil 528 that surrounds a transmitter support cylinder 530. In various implementations, the helical coil may be constructed of a conductive material. In further implementations, the helical coil may include a non-conductive insulating cover/wrap material.

The resonant receiver of the depicted implementation comprises a single receiver prong 532 that extends from a receiver base member 534. In various implementations, the resonant receiver (in the depicted implementation the receiver prong 532) may be constructed of a conductive material. In further implementations, the resonant receiver (in the depicted implementation the receiver prong 532) may be constructed of a ferromagnetic material including, but not limited to, cobalt, iron, nickel, and combinations thereof. In various implementations, the receiver base member 534 may be constructed of a non-conductive and/or insulating material As illustrated, the resonant transmitter may extend proximate an engagement end of the housing 518, and may be configured to surround the portion of the heated end 506 of the aerosol source member 504 that includes the inhalable substance medium. As illustrated in FIGS. 11 and 12, the resonant transmitter (e.g., the helical coil 528 may surround a transmitter support cylinder 530. The support cylinder 530, which may define a tubular configuration, may be configured to support the helical coil such that the coil does not move into contact with, and thereby short-circuit with, the resonant receiver prong 532. In such a manner, the transmitter support cylinder 530 may comprise a nonconductive material, which may be substantially transparent to an oscillating magnetic field produced by the helical coil. In various implementations, the helical coil 528 may be imbedded in, or otherwise coupled to, the transmitter support cylinder 530. In the illustrated implementation, the helical coil is engaged with an outer surface of the transmitter support cylinder; however, in other implementations, the helical coil may be positioned at an inner surface of the transmitter support cylinder or be fully imbedded in the transmitter support cylinder.

In various implementations, the control body may include one or more positioning features located therein, which in conjunction with, or as an alternative to, an opening of the housing, may facilitate proper positioning of the aerosol source member when the aerosol source member is inserted into the control body. For example, in the illustrated implementation, the control body 504 includes a positioning cylinder 550 that extends from the opening 519 of the housing 518 through the support cylinder 530. In the illustrated implementation, an inner diameter of the positioning cylinder 550 may be slightly larger than or approximately equal to an outer diameter of a corresponding aerosol source member 504 (e.g., to create a sliding fit) such that the positioning cylinder 540 guides the aerosol source member 504 into the proper position (e.g., lateral position) with respect to the control body 502. In the illustrated implementation, the control body 502 is configured such that when the aerosol source member 504 is inserted into the control body 502, the receiver prong 532 is located in the approximate radial center of the heated end 506 of the aerosol source member 504. In such a manner, when used in conjunction with an extruded inhalable substance medium that defines a tube structure, the receiver prong is located inside of and does not contact an inner surface defined by the extruded tube structure. In various implementations, the positioning cylinder may comprise a nonconductive material, which may be substantially transparent to the oscillating magnetic field produced by the resonant transmitter.

Figure 13:
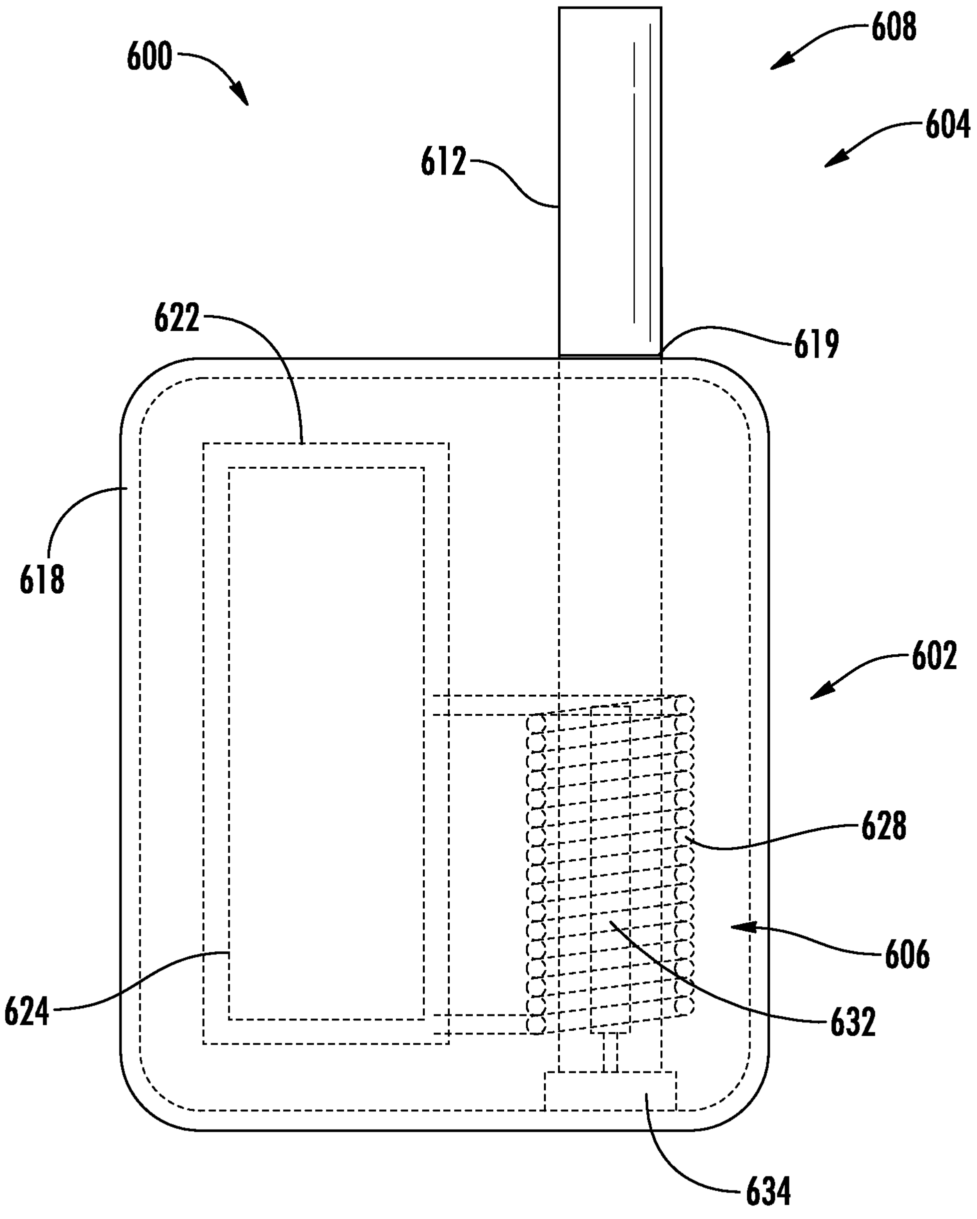
FIG. 13 illustrates a front view of an aerosol delivery device according to an example implementation of the present disclosure.

An alternate implementation is illustrated in FIG. 13. Similar to the implementation described with respect to FIGS. 11 and 12, the implementation depicted in FIG. 13 includes an aerosol delivery device 600 comprising a control body 602 that is configured to receive an aerosol source member 604. As noted above, the aerosol source member 604 may comprise a heated end 606, which is configured to be inserted into the control body 602, and a mouth end 608, upon which a user draws to create the aerosol. At least a portion of the heated end 606 may include an inhalable substance medium, which may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various implementations, the aerosol source member 604, or a portion thereof, may be wrapped in an overwrap material 612, which may be formed of any material useful for providing additional structure and/or support for the aerosol source member 604. Various configurations of possible overwrap materials are described with respect to the example implementation of FIGS. 3 and 4 above.

In various implementations, the mouth end 608 of the aerosol source member 604 may include a filter, which may be made of a cellulose acetate or polypropylene material. As noted above, in various implementations, the filter may increase the structural integrity of the mouth end of the aerosol source member, and/or provide filtering capacity, if desired, and/or provide resistance to draw. In some embodiments, the filter may be separate from the overwrap, and the filter may be held in position near the cartridge by the overwrap. Various configurations of possible filter characteristics are described with respect to the example implementation of FIGS. 3 and 4 above.

The control body 602 may comprise a housing 618 that includes an opening 619 defined therein, a flow sensor (not shown, e.g., a puff sensor or pressure switch), a control component 622 (e.g., a microprocessor, individually or as part of a microcontroller, a printed circuit board (PCB) that includes a microprocessor and/or microcontroller, etc.), and a power source 624 (e.g., a battery, which may be rechargeable, and/or a rechargeable supercapacitor). Examples of power sources, sensors, and various other possible electrical components are described above with respect to the example implementation of FIGS. 3 and 4 above.

The control body 602 of the implementation depicted in FIG. 13 includes a resonant transmitter, and a resonant receiver, which together form the resonant transformer. The resonant transformer of various implementations of the present disclosure may take a variety of forms, including implementations where one or both of the resonant transmitter and resonant receiver are located in the control body and/or the aerosol delivery device. In the particular implementation illustrated in FIG. 13, the resonant transmitter comprises a helical coil 628. In various implementations, the helical coil may be constructed of a conductive material. In further implementations, the helical coil may include a non-conductive insulating cover/wrap material. Although in some implementations, a resonant transmitter may surround a transmitter support member (such as a transmitter support cylinder), in the illustrated embodiment, the coil itself forms a cylinder-like structure. For example, in the illustrated implementation, the individual coils of the helical coil 628 are close to each other such that the helical coil 628 effectively creates a cylinder shape.

In the illustrated implementation, the resonant receiver comprises a single receiver prong 632 that extends from a receiver base member 634. In various implementations, the resonant receiver (in the depicted implementation the receiver prong 632) may be constructed of a conductive material. In further implementations, the resonant receiver (in the depicted implementation the receiver prong 632) may be constructed of a ferromagnetic material including, but not limited to, cobalt, iron, nickel, and combinations thereof. In various implementations, the receiver base member 634 may be constructed of a non-conductive and/or insulating material As illustrated, the resonant transmitter may extend proximate an engagement end of the housing 618, and may be configured to surround the portion of the heated end 606 of the aerosol source member 604 that includes the inhalable substance medium.

While not shown in the illustrated implementation, in various other implementations, the control body may include one or more positioning features located therein, which in conjunction with, or as an alternative to, an opening of the housing, may facilitate proper positioning of the aerosol source member when the aerosol source member is inserted into the control body. For example, in a further implementation, the control body of the illustrated implementation may include a positioning cylinder that extends from the opening of the housing through the helical coil such that an inner diameter of the positioning cylinder may be slightly larger than or approximately equal to an outer diameter of a corresponding aerosol source member (e.g., to create a sliding fit) so that the positioning cylinder may guide the aerosol source member 604 into the proper position with respect to the control body. In the illustrated implementation, the control body 602 is configured such that when the aerosol source member 404 is inserted into the control body 602, the receiver prong 632 is located in the approximate radial center of the heated end 606 of the aerosol source member 604. In such a manner, when used in conjunction with an extruded inhalable substance medium that defines a tube structure, the receiver prong is located inside of and does not contact an inner surface defined by the extruded tube structure. In various implementations, the positioning cylinder may comprise a nonconductive material, which may be substantially transparent to the oscillating magnetic field produced by the resonant transmitter.

While the housings of the implementations of the present disclosure illustrated in FIGS. 3-6 and 9-10 are substantially cylindrical, the housings of the implementations illustrated in FIGS. 11, 12, and 13 represents a small hand-held box shape. In various implementations, such a size and shape may allow for a larger power source and/or a larger control component, either or both of which may advantageously affect the performance of the aerosol delivery device.

As described below in detail, the resonant transmitter and resonant receiver of the various implementations described above may be configured to receive an electrical current from a power source so as to wirelessly heat the aerosol source member to create an inhalable aerosol. Thus, in various implementations the resonant transmitter may include electrical connectors configured to supply the electrical current thereto. For example, in various implementations electrical connectors may connect the resonant transmitter to the control component. In other implementations, the resonant transmitter may connect directly to the control component. In any event, current from the power source may be selectively directed to the resonant transmitter as controlled by the control component. For example, in various implementations the control component may direct current from the power source to the resonant transmitter when a draw on the aerosol source member is detected by the flow sensor of the control body. The electrical connectors may comprise, by way of example, terminals, wires, or any other implementation of connector configured to transmit electrical current therethrough. Further, the electrical connectors may include a negative electrical connector and a positive electrical connector.

In some implementations, the power source may comprise a battery and/or a rechargeable supercapacitor, which may supply direct current. As described elsewhere herein, operation of the aerosol delivery device may require directing alternating current to the resonant transmitter to produce an oscillating magnetic field in order to induce eddy currents in the resonant receiver. Accordingly, in some implementations, the control component of the control body may include an inverter or an inverter circuit configured to transform direct current provided by the power source to alternating current that is provided to the resonant transmitter.

As noted above, in some implementations of the disclosure, the inhalable substance medium may be positioned in proximity to, but out of contact with, the resonant transmitter and/or resonant receiver. Such implementations may include, but need not be limited to, implementations in which the aerosol source member includes an extruded inhalable substance medium that defines a tube structure or implementation in which the resonant receiver comprises a cylindrical structure. Configurations such as these may avoid build-up of residue on the resonant receiver due to the lack of direct contact therebetween. However, in other implementations, the inhalable substance medium may contact the resonant receiver. Direct contact between the resonant receiver and the substrate may facilitate heat transfer from the resonant receiver to the inhalable substance medium via convection, rather than radiant heating employed in implementations in which there is no direct contact therebetween. Accordingly, it should be understood that each of the implementations of the aerosol source members disclosed herein may include direct contact between the resonant receiver and the inhalable substance medium. Providing for direct contact between the inhalable substance medium and the resonant receiver may be employed, by way of example, in implementations in which the inhalable substance medium comprises a solid tobacco material or a semi-solid tobacco material.

As noted above, the aerosol source members of the present disclosure are configured to operate in conjunction with a control body to produce an aerosol. In particular, when an aerosol source member is coupled to a control body (e.g., when an aerosol source member is inserted into a control body), the resonant transmitter may at least partially surround, and preferably substantially surround, and more preferably fully surround the resonant receiver (e.g., by extending around the circumference thereof). Further, the resonant transmitter may extend along at least a portion of the longitudinal length of the resonant receiver, and preferably may extend along a majority of the longitudinal length of the resonant receiver, and most preferably extend along substantially all or more than the longitudinal length of the resonant receiver. In addition, in various implementations, when an aerosol source member is inserted into a control body, the resonant receiver may extend at least a portion of the longitudinal length of the inhalable substance medium, and preferably may extend along a majority of the longitudinal length of the inhalable substance medium, and most preferably extend along substantially all or more than the longitudinal length of the inhalable substance medium.

Accordingly, in the various implementations described above, a receiver may be positioned inside of an area defined by a resonant transmitter. In such a manner, when a user draws on the mouth end of the aerosol source member, the pressure sensor may detect the draw, and thereby the control component may direct current from the power source to the resonant transmitter. The resonant transmitter may thereby produce an oscillating magnetic field. As a result of the resonant receiver being positioned inside of the area defined by the resonant transmitter, the resonant receiver may be exposed to the oscillating magnetic field produced by the resonant transmitter.

In particular, the resonant transmitter and the resonant receiver together form a resonant transformer. In some examples, the resonant transformer and associated circuitry including the inverter may be configured to operate according to a suitable wireless power transfer standard such as the Qi interface standard developed by the Wireless Power Consortium (WPC), the Power Matters Alliance (PMA) interface standard developed by the PMA, the Rezence interface standard developed by the Alliance for Wireless Power (A4WP), and the like.

According to example implementations, a change in current in the resonant transmitter, as directed thereto from the power source by the control component, may produce an alternating electromagnetic field that penetrates the resonant receiver, thereby generating electrical eddy currents within the resonant receiver. The alternating electromagnetic field may be produced by directing alternating current to the resonant transmitter. As noted above, in some implementations, the control component may include an inverter or inverter circuit configured to transform direct current provided by the power source to alternating current that is provided to the resonant transmitter.

The eddy currents flowing in the material defining the resonant receiver may heat the resonant receiver through the Joule effect, wherein the amount of heat produced is proportional to the square of the electrical current times the electrical resistance of the material of the resonant receiver. In implementations of the resonant receiver comprising ferromagnetic materials, heat may also be generated by magnetic hysteresis losses. Several factors contribute to the temperature rise of the resonant receiver including, but not limited to, proximity to the resonant transmitter, distribution of the magnetic field, electrical resistivity of the material of the resonant receiver, saturation flux density, skin effects or depth, hysteresis losses, magnetic susceptibility, magnetic permeability, and dipole moment of the material.

In this regard, both the resonant receiver and the resonant transmitter may comprise an electrically conductive material. By way of example, the resonant transmitter and/or the resonant receiver may comprise various conductive materials including metals such as cooper and aluminum, alloys of conductive materials (e.g., diamagnetic, paramagnetic, or ferromagnetic materials) or other materials such as a ceramic or glass with one or more conductive materials imbedded therein. In another implementation, the resonant receiver may comprise conductive particles. In some implementations, the resonant receiver may be coated with or otherwise include a thermally conductive passivation layer (e.g., a thin layer of glass).

Accordingly, in various implementations the resonant receiver may be heated by the resonant transmitter. The heat produced by the resonant receiver may heat the inhalable substance medium such that an aerosol is produced. By positioning the resonant receiver around and/or inside the inhalable substance medium at a substantially uniform distance therefrom (e.g., by aligning the longitudinal axes of the inhalable substance medium and the resonant receiver), the inhalable substance medium may be substantially uniformly heated.

The aerosol may travel around or through the resonant receiver and/or the resonant transmitter. For example, as illustrated, in one implementation, the resonant receiver may comprise an open-ended cylinder structure, or a cylinder structure with an open end proximate the engaging end of the control body. In other implementations, the resonant receiver may comprise one or more prongs or rods imbedded in a base member. In some instances, the resonant receiver may contact an inhalable substance medium. In other implementations, the resonant receiver may comprise a plurality of beads or particles imbedded in, or otherwise part of, an inhalable substance medium. In each of these implementations, the aerosol may pass freely through the resonant receiver and/or the inhalable substance medium to allow the aerosol to travel through the mouth end of the aerosol source member to the user.

The aerosol may mix with air entering through ventilation holes/inlets, which may be defined in housing of the control body. For example, in some implementations, ventilation holes may be defined around a periphery of the housing upstream from the heated end of the aerosol source member. Accordingly, an air and aerosol mixture may be directed to the user. For example, the air and aerosol mixture may be directed to the user through a filter on the mouth end of the aerosol source member. However, as may be understood, the flow pattern through the aerosol delivery device may vary from the particular configuration described above in any of various manners without departing from the scope of the present disclosure.

In some implementations, the aerosol source member may further comprise an authentication component, which may be configured to allow for authentication of the aerosol source member. Thereby, for example, the control component may direct current to the resonant transmitter only when the aerosol source member is verified as authentic. In some implementations, the authentication component may comprise a radio-frequency identification (RFID) chip configured to wirelessly transmit a code or other information to the control body. Thereby, the aerosol delivery device may be used without requiring engagement of electrical connectors between the aerosol source member and the control body. Further, various examples of control components and functions performed thereby are described in U.S. Pat. App. Pub. No. 2014/0096782 to Ampolini et al., which is incorporated herein by reference in its entirety.

As indicated above, in some implementations, the control component of the control body may include an inverter or an inverter circuit configured to transform direct current provided by the power source to alternating current that is provided to the resonant transmitter. The inverter may also include an inverter controller embodied as an integrated circuit and configured to output a signal configured to drive the resonant transmitter to generate an oscillating magnetic field and induce an alternating voltage in the resonant receiver when exposed to the oscillating magnetic field. This alternating voltage causes the resonant receiver to generate heat and thereby creates an aerosol from the inhalable substance medium.

As indicated above, in some examples, the aerosol delivery device may further include a power source, such as a rechargeable supercapacitor, rechargeable solid-state battery, or rechargeable lithium-ion battery, configured to power the inverter. In some further examples, the aerosol delivery device may further include a voltage regulator configured to maintain a constant voltage level at the inverter. In some examples, where the power source includes a rechargeable power source, the power source may further include terminals connectable with a source of energy from which the rechargeable power source is chargeable. As indicated above, for example, the control body may be combined with any type of recharging technology (e.g., wall charger, car charger, computer, photovoltaic cell, solar panel of solar cells, wireless RF based charger). And in yet further examples, the power source may further include the source of energy, and the source of energy may be or may include a rechargeable solid-state battery or rechargeable lithium-ion battery.

In some examples, the aerosol delivery device may further protect against the temperature of the resonant receiver reaching or exceeding a threshold temperature. In some of these examples, the control component may include a microprocessor configured to receive a measurement of an alternating current induced in the resonant receiver. The microprocessor may then control operation of at least one functional element of the aerosol delivery device in response to the measurement, such as to reduce the temperature of the resonant receiver in instances in which the measurement indicates a temperature at or above a threshold temperature. One manner of reducing temperature may be to reduce, modulate, and/or stop the current supplied to resonant transmitter. Some examples are described in U.S. patent application Ser. No. 14/993,762 to Sur, filed Jan. 12, 2016, which is incorporated herein by reference in its entirety.

Further examples of various induction-based control components and associated circuits are described in U.S. patent application Ser. No. 15/352,153 to Sur et al., and U.S. Patent Application Publication No. 2017/0202266 to Sur et al., each of which is incorporated herein by reference in its entirety.

As described above, the present disclosure relates to aerosol delivery device including a control body comprising a wireless power transmitter configured to receive an electrical current from a power source and wirelessly heat an inhalable substance medium. As may be understood, various wireless heating techniques may be employed to heat an inhalable substance medium. In the implementations described above, the wireless power transmitter may comprise a resonant transmitter and a resonant receiver. Thereby, eddy currents may be induced at the resonant receiver in order to produce heat. As further noted above, the resonant transmitter may be configured to at least partially surround the resonant receiver. However, various other techniques and mechanisms may be employed in other implementations to heat an inhalable substance medium. Example implementations of such techniques and mechanisms are provided in U.S. Pat. No. 9,078,473 to Worm et al., which is incorporated herein by reference in its entirety. In addition, while example shapes and configurations of a resonant receiver and resonant transmitter are described herein, various other configurations and shapes may be employed.

Note that although the present disclosure generally describes heating an inhalable substance medium positioned in proximity to a resonant receiver to produce an aerosol, in other implementations, a resonant receiver may be configured to heat a liquid aerosol precursor composition such as described in U.S. patent application Ser. No. 15/352,153 to Sur et al., which is incorporated herein by reference in its entirety. In still other implementations, a resonant receiver may be configured to heat an aerosol precursor composition directed (e.g., dispensed) thereto. For example, U.S. Pat. App. Pub. Nos. 2015/0117842; 2015/0114409; and 2015/0117841, each to Brammer et al., disclose fluid aerosol precursor composition delivery mechanisms and methods, which are incorporated herein by reference in their entireties. Such fluid aerosol precursor composition delivery mechanisms and methods may be employed to direct an aerosol precursor composition from a reservoir to a resonant receiver to produce an aerosol.

Note also that while example shapes and configurations of a resonant receiver and resonant transmitter are described herein, various other configurations and shapes may be employed.

In various implementations, the present disclosure also includes a method for assembling an aerosol delivery device. In particular, such a method may comprise providing an aerosol source member that includes an inhalable substance medium. The method may further comprise providing a resonant receiver. Additionally, the method may comprise positioning the inhalable substance medium in proximity to the resonant receiver. The method may further comprise exposing the resonant receiver to an oscillating magnetic field to heat the inhalable substance medium to produce an aerosol.

In some implementations positioning the inhalable substance medium in proximity to the resonant receiver may comprise positioning the inhalable substance medium in direct contact with the resonant receiver. In other implementations, positioning the inhalable substance medium in proximity to the resonant receiver may comprise positioning the inhalable substance medium around and/or inside at least a portion of the resonant receiver.

The method may additionally include providing a resonant transmitter and positioning the resonant transmitter relative to the resonant receiver such that the resonant transmitter at least partially surrounds the resonant receiver. In some implementations, positioning the resonant transmitter may include positioning the resonant transmitter out of direct contact with the resonant receiver.

The method may additionally include forming a control body that includes the resonant transmitter and the resonant receiver, wherein the step of positioning the inhalable substance medium in proximity to the resonant receiver may comprise inserting the aerosol source member into the control body. Additionally, forming the control body may include coupling a power source to the resonant transmitter.

In various implementations, the present disclosure also includes a method for aerosolization. In particular, such a method may comprise providing an aerosol source member, which may include an inhalable substance medium. The method may additionally include providing a control body, which may include a power source and a wireless power transmitter. The method may further include directing current from the power source to the wireless power transmitter. Additionally, the method may include wirelessly heating the inhalable substance medium with the wireless power transmitter to produce an aerosol.

Many modifications and other implementations of the disclosure will come to mind to one skilled in the art to which this disclosure pertains having the benefit of the teachings presented in the foregoing descriptions and the associated drawings. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. An aerosol delivery device comprising:

a control body;

a resonant transmitter; and an aerosol source member that includes an inhalable substance medium and a resonant receiver, wherein the aerosol source member is configured to be insertable into the control body, wherein the resonant transmitter is located within the control body and is configured to generate an oscillating magnetic field and induce an alternating voltage in the resonant receiver when exposed to the oscillating magnetic field, the alternating voltage causing the resonant receiver to generate heat and thereby vaporize components of the inhalable substance medium to produce an aerosol, wherein the resonant transmitter comprises a transmitter coil, wherein the control body further comprises a coil support member, and wherein the resonant receiver is located in an approximate center of the aerosol source member.

2. The aerosol delivery device of claim 1, wherein the aerosol source member defines a heated end, and wherein the approximate center of the aerosol source member comprises an approximate radial center of the heated end of the aerosol source member.

3. The aerosol delivery device of claim 1, wherein the resonant receiver comprises a receiver cylinder.

4. The aerosol delivery device of claim 3, wherein the receiver cylinder comprises a hollow receiver cylinder.

5. The aerosol delivery device of claim 1, wherein the resonant receiver comprises a braided wire structure.

6. The aerosol delivery device of claim 5, wherein inhalable substance medium comprises a tube structure defining an inner surface and an outer surface, and wherein the approximate center of the aerosol source member comprises an area between the inner and outer surfaces of the inhalable substance medium.

7. The aerosol delivery device of claim 1, wherein the inhalable substance medium comprises a solid or semi-solid medium.

8. The aerosol delivery device of claim 1, wherein the resonant receiver is constructed of one or more ferromagnetic materials.

9. The aerosol delivery device of claim 1, wherein the resonant receiver is constructed of one or more conductive materials.

10. The aerosol delivery device of claim 1, further comprising a power source located in the control body including one or more of a rechargeable supercapacitor, a rechargeable solid-state battery, and a rechargeable lithium-ion battery, the power source being configured to power the resonant transmitter.

11. The aerosol delivery device of claim 10, wherein the power source further includes terminals connectable with a source of energy from which the rechargeable power source is chargeable.

12. The aerosol delivery device of claim 1, wherein the resonant transmitter is configured to at least partially surround the resonant receiver.

13. The aerosol delivery device of claim 1, wherein the inhalable substance medium comprises a tobacco material.

14. The aerosol delivery device of claim 13, wherein the inhalable substance medium comprises a reconstituted tobacco material.

15. The aerosol delivery device of claim 1 further comprising a foil material, wherein the foil material surrounds at least a portion of the coil support member.

16. The aerosol delivery device of claim 1, wherein the control body further comprises one or more light emitting diodes.

17. The aerosol delivery device of claim 1, wherein the control body includes an additional resonant receiver.

18. The aerosol delivery device of claim 17, wherein the additional resonant receiver comprises a hollow receiver cylinder.

19. The aerosol delivery device of claim 1, wherein the resonant receiver contacts the inhalable substance medium.

20. The aerosol delivery device of claim 1, wherein the resonant receiver does not contact the inhalable substance medium.

* * * * *